(12) United States Patent
El-Moussa et al.

(10) Patent No.: US 11,562,076 B2
(45) Date of Patent: *Jan. 24, 2023

(54) RECONFIGURED VIRTUAL MACHINE TO MITIGATE ATTACK

(71) Applicant: British Telecommunications Public Limited Company, London (GB)

(72) Inventors: Fadi El-Moussa, London (GB); Ian Herwono, London (GB)

(73) Assignee: British Telecommunications Public Limited Company, London (GB)

( * ) Notice: Subject to any disclaimer, the term of this patent is extended or adjusted under 35 U.S.C. 154(b) by 964 days.

This patent is subject to a terminal disclaimer.

(21) Appl. No.: 16/323,084

(22) PCT Filed: Jul. 25, 2017

(86) PCT No.: PCT/EP2017/068738
§ 371 (c)(1),
(2) Date: Feb. 4, 2019

(87) PCT Pub. No.: WO2018/033350
PCT Pub. Date: Feb. 22, 2018

(65) Prior Publication Data
US 2019/0188392 A1    Jun. 20, 2019

(30) Foreign Application Priority Data
Aug. 16, 2016    (EP) .................................... 16184383

(51) Int. Cl.
*G06F 21/57*    (2013.01)
*G06F 9/455*    (2018.01)
(Continued)

(52) U.S. Cl.
CPC ........ *G06F 21/577* (2013.01); *G06F 9/45558* (2013.01); *G06K 9/6267* (2013.01);
(Continued)

(58) Field of Classification Search
CPC ... G06F 21/577; G06F 9/45558; G06N 20/00; G06N 3/0472; G06K 9/6267; H04L 63/1433; H04L 63/1466
See application file for complete search history.

(56) References Cited

U.S. PATENT DOCUMENTS 6,275,536 B1    8/2001    Chen et al.
6,546,397 B1    4/2003    Rempell
(Continued)

FOREIGN PATENT DOCUMENTS

EP    2741227 A1    6/2014
EP    2750070 A2    7/2014
(Continued)

OTHER PUBLICATIONS

Atoum et al. (Effective Belief Network for Cyber Security Frameworks, International Journal of Security and Its Applications vol. 10, No. 4 (2016), pp. 221-228) (Year: 2016).*
(Continued)

*Primary Examiner* — Oleg Korsak
(74) *Attorney, Agent, or Firm* — Patterson Thuente, P.A.

(57) ABSTRACT

A computer implemented method to mitigate a security attack against a target virtual machine (VM) in a virtualized computing environment, the target VM having a target VM configuration including configuration parameters, and the security attack exhibiting a particular attack characteristic, is disclosed.

11 Claims, 22 Drawing Sheets

(51) Int. Cl.
  *H04L 9/40* (2022.01)
  *G06N 20/00* (2019.01)
  *G06K 9/62* (2022.01)
  *G06N 3/04* (2006.01)

(52) U.S. Cl.
  CPC ........... *G06N 3/0472* (2013.01); *G06N 20/00* (2019.01); *H04L 63/1433* (2013.01); *H04L 63/1466* (2013.01); *G06F 2009/45587* (2013.01)

(56) References Cited

U.S. PATENT DOCUMENTS

| | | |
|---|---|---|
| 7,007,301 B2 | 2/2006 | Crosbie et al. |
| 7,093,750 B1 | 8/2006 | Block et al. |
| 7,127,461 B1 | 10/2006 | Zhu et al. |
| 7,716,739 B1 | 5/2010 | McCorkendale |
| 8,479,276 B1 | 7/2013 | Vaystikh et al. |
| 8,713,631 B1 | 4/2014 | Pavlyushchik |
| 8,751,466 B1 | 6/2014 | Tsay |
| 8,806,638 B1 | 8/2014 | Mani |
| 8,813,234 B1 * | 8/2014 | Bowers ............... H04L 63/20 726/25 |
| 8,898,788 B1 | 11/2014 | Aziz et al. |
| 8,910,238 B2 | 12/2014 | Lukacs et al. |
| 8,914,406 B1 | 12/2014 | Haugsnes et al. |
| 9,009,825 B1 | 4/2015 | Chang et al. |
| 9,043,922 B1 | 5/2015 | Dumitras et al. |
| 9,535,727 B1 | 1/2017 | Jerbi et al. |
| 9,576,137 B2 | 2/2017 | Habel et al. |
| 9,626,173 B1 | 4/2017 | Jurova et al. |
| 9,671,816 B2 | 6/2017 | Berry |
| 9,807,106 B2 | 10/2017 | Daniel et al. |
| 9,942,267 B1 | 4/2018 | Tripathi et al. |
| 9,942,268 B1 | 4/2018 | Danileiko |
| 10,108,803 B2 * | 10/2018 | Chari ................... G06F 21/577 |
| 10,747,886 B2 * | 8/2020 | El-Moussa .......... G06F 9/45558 |
| 11,075,945 B2 * | 7/2021 | Ismael ................. H04L 63/145 |
| 2001/0019614 A1 | 9/2001 | Madoukh |
| 2003/0084349 A1 | 5/2003 | Friedrichs et al. |
| 2003/0167421 A1 | 9/2003 | Klemm |
| 2003/0217053 A1 | 11/2003 | Bachman et al. |
| 2004/0149818 A1 | 8/2004 | Shepley et al. |
| 2004/0158741 A1 | 8/2004 | Schneider |
| 2004/0230834 A1 | 11/2004 | McCallam |
| 2005/0054268 A1 | 3/2005 | Kistler et al. |
| 2005/0097146 A1 | 5/2005 | Konstantinou et al. |
| 2005/0108562 A1 | 5/2005 | Khazan, I et al. |
| 2006/0101401 A1 | 5/2006 | Brumme et al. |
| 2006/0103736 A1 | 5/2006 | Obrador |
| 2006/0133513 A1 | 6/2006 | Kounnas |
| 2007/0016953 A1 | 1/2007 | Morris et al. |
| 2007/0089111 A1 | 4/2007 | Robinson et al. |
| 2007/0240222 A1 | 10/2007 | Tuvell et al. |
| 2007/0291791 A1 | 12/2007 | English et al. |
| 2008/0320594 A1 | 12/2008 | Jiang |
| 2009/0044024 A1 | 2/2009 | Oberheide et al. |
| 2009/0055693 A1 | 2/2009 | Budko et al. |
| 2009/0099860 A1 | 4/2009 | Karabulut et al. |
| 2010/0011029 A1 | 1/2010 | Niemelae |
| 2010/0012718 A1 | 1/2010 | Griswold et al. |
| 2010/0057774 A1 | 3/2010 | Pizano et al. |
| 2010/0071066 A1 | 3/2010 | Kline et al. |
| 2010/0138674 A1 | 6/2010 | Dimitrakos et al. |
| 2010/0162346 A1 | 6/2010 | Holostov et al. |
| 2010/0175108 A1 | 7/2010 | Protas |
| 2010/0199351 A1 | 8/2010 | Protas et al. |
| 2010/0228694 A1 | 9/2010 | Le et al. |
| 2010/0257608 A1 | 10/2010 | Jeong et al. |
| 2010/0262873 A1 | 10/2010 | Chang et al. |
| 2010/0306772 A1 | 12/2010 | Arnold et al. |
| 2010/0318652 A1 | 12/2010 | Samba |
| 2011/0004935 A1 | 1/2011 | Moffie et al. |
| 2011/0023118 A1 | 1/2011 | Wright |
| 2011/0126110 A1 | 5/2011 | Vilke et al. |
| 2011/0138441 A1 | 6/2011 | Neystadt et al. |
| 2011/0167491 A1 | 7/2011 | Ruggerio |
| 2011/0197256 A1 | 8/2011 | Sharkey et al. |
| 2011/0228924 A1 | 9/2011 | Tal et al. |
| 2012/0030120 A1 | 2/2012 | Rosa et al. |
| 2012/0081395 A1 | 4/2012 | Adi et al. |
| 2012/0284794 A1 | 11/2012 | Trent et al. |
| 2012/0323829 A1 * | 12/2012 | Stokes ................. G06K 9/6224 706/12 |
| 2012/0323853 A1 | 12/2012 | Fries et al. |
| 2013/0006949 A1 | 1/2013 | Essawi et al. |
| 2013/0024567 A1 | 1/2013 | Roxburgh et al. |
| 2013/0055398 A1 | 2/2013 | Li et al. |
| 2013/0097248 A1 | 4/2013 | Chakra et al. |
| 2013/0232470 A1 | 9/2013 | Yung |
| 2013/0263125 A1 | 10/2013 | Shamsee et al. |
| 2013/0333045 A1 | 12/2013 | Shigemoto et al. |
| 2014/0090008 A1 | 3/2014 | Li et al. |
| 2014/0107836 A1 | 4/2014 | Crews et al. |
| 2014/0164251 A1 | 6/2014 | Loh |
| 2014/0173740 A1 | 6/2014 | Albanese et al. |
| 2014/0331277 A1 | 11/2014 | Frascadore et al. |
| 2015/0101055 A1 | 4/2015 | Tang et al. |
| 2015/0120567 A1 | 4/2015 | Van et al. |
| 2015/0220735 A1 | 8/2015 | Paithane et al. |
| 2015/0309780 A1 | 10/2015 | Ruehl et al. |
| 2015/0312274 A1 | 10/2015 | Bishop et al. |
| 2015/0332283 A1 | 11/2015 | Witchey |
| 2015/0378763 A1 | 12/2015 | Hassine et al. |
| 2016/0019385 A1 | 1/2016 | Holt |
| 2016/0021122 A1 | 1/2016 | Pevny |
| 2016/0110192 A1 | 4/2016 | Mikkilineni |
| 2016/0164894 A1 | 6/2016 | Zeitlin et al. |
| 2016/0283307 A1 | 9/2016 | Takeshima et al. |
| 2016/0294875 A1 | 10/2016 | Lian et al. |
| 2016/0342801 A1 | 11/2016 | Sreekanti et al. |
| 2016/0366155 A1 | 12/2016 | El-Moussa et al. |
| 2017/0013000 A1 | 1/2017 | El-Moussa et al. |
| 2017/0034023 A1 | 2/2017 | Nickolov et al. |
| 2017/0048252 A1 | 2/2017 | Straub et al. |
| 2017/0048319 A1 | 2/2017 | Straub |
| 2017/0103203 A1 | 4/2017 | Sharma et al. |
| 2017/0104780 A1 | 4/2017 | Zaffarano et al. |
| 2017/0142133 A1 | 5/2017 | Kallos |
| 2017/0223032 A1 | 8/2017 | El-Moussa et al. |
| 2017/0323113 A1 | 11/2017 | El-Moussa et al. |
| 2017/0351860 A1 | 12/2017 | El-Moussa et al. |
| 2017/0351861 A1 | 12/2017 | El-Moussa et al. |
| 2018/0025166 A1 | 1/2018 | Daniel et al. |
| 2018/0053002 A1 | 2/2018 | El et al. |
| 2018/0054451 A1 | 2/2018 | El et al. |
| 2018/0060575 A1 | 3/2018 | El et al. |
| 2018/0060581 A1 | 3/2018 | El et al. |
| 2018/0060582 A1 | 3/2018 | El et al. |
| 2018/0091531 A1 | 3/2018 | El-Moussa et al. |
| 2018/0115566 A1 | 4/2018 | Azvine et al. |
| 2018/0115567 A1 | 4/2018 | El-Moussa et al. |

FOREIGN PATENT DOCUMENTS

| | | |
|---|---|---|
| EP | 2816469 A1 | 12/2014 |
| WO | WO-0184285 A2 | 11/2001 |
| WO | WO-2009097610 A1 | 8/2009 |
| WO | WO-2012087685 A1 | 6/2012 |
| WO | WO-2013172750 A1 | 11/2013 |
| WO | WO-2014090488 A1 | 6/2014 |
| WO | WO-2015128612 A1 | 9/2015 |
| WO | WO-2015179020 A2 | 11/2015 |
| WO | WO-2016034496 A1 | 3/2016 |
| WO | WO-2017021153 A1 | 2/2017 |
| WO | WO-2017021154 A1 | 2/2017 |
| WO | WO-2017021155 A1 | 2/2017 |
| WO | WO-2017109128 A1 | 6/2017 |
| WO | WO-2017109129 A1 | 6/2017 |
| WO | WO-2017167544 A1 | 10/2017 |
| WO | WO-2017167545 A1 | 10/2017 |
| WO | WO-2018033350 A1 | 2/2018 |

(56) References Cited

FOREIGN PATENT DOCUMENTS

| WO | WO-2018033375 A2 | 2/2018 |
|----|------------------|--------|
| WO | WO-2018033375 A3 | 3/2018 |

OTHER PUBLICATIONS

Singhal et al. (Security Risk Analysis of Enterprise Networks Using Probabilistic Attack Graphs, NIST Interagency Report 7788, Aug. 2011, 24 pages) (Year: 2011).*
Xie et al. (Applying Attack Graphs to Network Security Metric, 2009 International Conference on Multimedia Information Networking and Security, 5 pages) (Year: 2009).*
Frigault et al. (Measuring Network Security Using Dynamic Bayesian Network, QoP'08, Oct. 27, 2008, 7 pages) (Year: 2008).*
"A Next-Generation Smart Contract and Decentralized Application Platform" Ethereum White Paper, 2016, retrieved from https://github.com/ethereum/wiki/wiki/White-Paper on Nov. 13, 2018, 40 pages.
Adler M., "Threat Intelligence Visibility—the way forward," BT, 2015, available from www.globalservices.bt.com/uk/en/products/assure threat_ monitoring, 8 pages.
Ahmad S., et al., "How Do Neurons Operate on Sparse Distributed Representations? A Mathematical Theory of Sparsity, Neurons and Active Dendrites," available from Cornell University Library (citation arXiv: 1601.00720) and https://arxiv.org/ftp/arxiv/papers/1601/1601.00720.pdf, retrieved on Mar. 28, 2018, 23 pages.
Ahmad S., et al., "Properties of Sparse Distributed Representations and their Application to Hierarchical Temporal Memory," available from Cornell University Library (citation arXiv: 1503.07469) and https://arx.iv.org/ftp/arx.iv/papers/1503/1503.07469.pdf, retrieved on Mar. 28, 2018, Numenta, Redwood City, CA, USA, Mar. 24, 2015, 18 pages.
Ahmad S., et al., "Real-Time Anomaly Detection for Streaming Analytics," available from Cornell University Library (citation arXiv: 1607.02480) and https://arxiv.org/pdf/1607.02480.pdf, retrieved on Mar. 28, 2018, Numenta, Inc., Redwood City, CA, USA, Jul. 8, 2016, 10 pages.
Anonymous, "Can BitCoin be a better DRM? BitcoinBeginners," retrieved from https://www.reddit.com/r/BitcoinBeginners/commentsll y5yh8/can bitcoin be_a_better_drm, Feb. 17, 2014, 3 pages.
Anonymous, "Colored Coins—Bitcoin Wiki," Retrieved from https://en.bitcoin.it/w/index.php?title=ColoredCoins&oldid=57259, Jul. 7, 2015, 6 pages.
Anonymous, "Who Will Protect Users From Ethereum Based Malware?: Ethereum," Mar. 28, 2016, Retrieved from https://www.reddit.com/r/ethereum/comments/4ccfaa/who_will_protect_users_from_ethereum_based_malware/?st=itbp2q49&sh=d8cc4355 on Nov. 13, 2018, 3 pages.
Antonopoulos A M., "Mastering Bitcoin—Unlocking Digital Crypto-Currencies," Early Release Raw & Unedited, ISBN: 978-1-449-37404-4; retrieved from: https://unglueitfiles.s3.amazonaws.com/ebf/05db7df4f31840f0a873d6ea14dcc28d.pdf, Dec. 2014, 282 pages.
Asmi E.A.K., et al., "Bitcoin-Based Decentralized Carbon Emissions Trading Infrastructure Model," Systems Engineering, Mar. 2015, vol. 18 (2), Retrieved from the Internet: URL: https://www.researchgate.net/publication/268686553, 15 pages.
Assia Y., et al., "Colored Coins Whitepaper," 2015, available at docs.google.com/document/d/1AnkPcVZTCMLizw4DvsW6M8Q2JCOllzrTLuoWu2z1BE, 23 pages.
Benders J.F., "Partitioning Procedures for Solving Mixed Variables Programming Problems," 1962, vol. 4, pp. 238-252.
Billaudelle S., et al., "Porting HTM Models to the Heidelberg Neuromorphic Computing Platform," available from Cornell University Library (citation arXiv: 1505. 02142), retrieved on Mar. 28, 2018, from https://arx.iv.org/pdf/1505.02142.pdf, Kirchhoff-Institute for Physics, May 2015, 9 pages.

Biryukov A., et al., "R&D in Smart Contracts, Cryptocurrency and Blockchain," University of Luxembourg, Jan. 19, 2016, XP055306767, Retrieved from http://wwwfr.uni.lu/snt/news_events/speaker_s_presentations on Sep. 29, 2016, pp. 51 pages.
Bonneau J., et al., "Research Perspectives and Challenges for Bitcoin and Cryptocurrencies," International Association for Cryptologic Research, Mar. 19, 2015, 18 pages.
Chaisiri, "Optimization of Resource Provisioning Cost in Cloud Computing," IEEE Transactions on Services Computing, Apr.-Jun. 2012, vol. 5 (2), 14 pages.
Chen E., "Introduction To Restricted Boltzmann Machines," Jul. 18, 2011; 5 pages.
Cruz J.P., et al., "The Bitcoin Network as Platform for TransOrganizational Attribute Authentication," WEB 2015, The Third International Conference on Building and Exploring Web Based Environments, XP055239598, Rome, Italy, 2015, 7 pages.
Cui, et al., "Continuous Online Sequence Learning with an Unsupervised Neural Network Model," Published in Neural Computation and available from https://www.mitpressjournals.org/doi/pdf/10.1162/NECOa_00893, retrieved on Mar. 28, 2018, Numenta Inc., Redwood City, CA, USA, Nov. 2016, vol. 28 (11), 31 pages.
Cui, et al., "The HTM Spatial Pooler: A Neocortical Algorithm for Online Sparse Distributed Coding," available from Cold Spring Harbor Laboratory bioRxiv (citation doi.org/10.1101/085035) and https://www.biorxiv.org/content/biorxiv/early/2017/02/16/085035.full.pdf, retrieved on Mar. 28, 2018, Numenta Inc., Redwood City, CA, USA, Feb. 3, 2017, 16 pages.
CVE Details The Ultimate Security Vulnerability Datasouce, "Current CVSS Score Distribution For All Vulnerabilities" retrieved from https://www.cvedetails.com/ on Jun. 28, 2018, 1 page.
Czepluch J.S., et al., "The Use of Block Chain Technology in Different Application Domains," XP055242451, retrieved from http://http://www.Iollike.org/bachelor.pdf, May 20, 2015, 109 pages.
Dewri R., et al., "Optimal Security Hardening using Multi-Objective Optimization on Attack Tree Models of Networks," CCS '07, ACM, Oct. 29-Nov. 2, 2007, pp. 204-213.
DMTF, "Open Virtualization Format Specification," Document No. DSP0243, Version: 1.1.0, Jan. 12, 2010, 42 pages.
Dr Gavin Wood, "Ethereum: A Secure Decentralize Generalized Transaction Ledger," EIP-150 Revision, Retrieved from http://gavwood.com//paper.pdf, Jun. 4, 2014, 32 pages.
European Search Report for Application No. 16184381.8, dated Feb. 16, 2017, 10 pages.
European Search Report for Application No. 16184384.2, dated Feb. 16, 2017, 74 pages.
European Search Report for Application No. 16184385.9, dated Feb. 24, 2017, 61 pages.
Extended European Search Report for Application No. EP14275221.1, dated Jan. 7, 2015, 6 pages.
Extended European Search Report for Application No. EP15179440.1, dated Feb. 10, 2016, 6 pages.
First.org, Inc., "Common Vulnerability Scoring System, V3 Development Update," available at www.first.org/cvss, CVSS v3.0 User Guide (v1.5), 15 pages.
Fischer A., et al., "An Introduction to Restricted Boltzmann Machines," in: Progress in Pattern Recognition, Image Analysis, Computer Vision and Applications, vol. 7441 of the series Lecture Notes in Computer Science, 2012, pp. 14-36.
Fischer A., et al., "Training restricted Boltzmann machines: An introduction," Pattern Recognition, vol. 47, No. 1, 2014, pp. 25-39.
Frigault M., "Measuring Network Security Using Bayesian Network-Based Attack Graphs," The Concordia Institute of Information systems Engineering, Mar. 2010, 88 pages.
Grushack J., et al., "Currency 3.0, Examining Digital Crypto Currency Markets," Union College, XP055242356, Retrieved from http://antipasto.union.edu/engineering/Archives/SeniorProjects/2014/CS.2014/files/grushacj/grushacj_paper.pdf, Jun. 2014, 44 pages.
Hawkins, et al., "Why Neurons Have Thousands of Synapses, A Theory of Sequence Memory in Neocortex," Published in Frontiers in Neural Circuits (10 (2016) 1-13, doi:I0.3389/fncir.2016.00023) and available from https://www.frontiersin.org/articlesII0.3389/fncir.2016.00023/full, retrieved on Mar. 28, 2018, Numenta Inc., Redwood City, CA, USA, Mar. 30, 2016, 13 pages.

(56) References Cited

OTHER PUBLICATIONS

Hawkins, et al., in "On Intelligence, How a New Understanding of the Brain Will Lead to the Creation of Truly Intelligent Machines," 2004, Times Books, ISBN 0-8050-7456-2, Jul. 14, 2005, 174 pages.
Hinton G., "A Beginner's Tutorial For Restricted Boltzmann Machines," https://deeplearning4j.org/restrictedboltzmannmachine.html, Aug. 31, 2018, 16 pages.
Hinton G., "A Practical Guide To Training Restricted Boltzmann Machines," Department of Computer Science, UTML TR 2010-003, Aug. 2, 2010, Version 1, 21 pages.
U.S. Appl. No. 16/065,637, filed Jun. 22, 2018, 166 pages, Inventor(s): El-Moussa et al.
International Preliminary Report on Patentability for Application No. PCT/EP2015/074970, dated May 11, 2017, 10 pages.
International Preliminary Report on Patentability for Application No. PCT/EP2015/080244, dated Jul. 13, 2017, 8 pages.
International Preliminary Report on Patentability for Application No. PCT/EP2015/080246, dated Jul. 13, 2017, 8 pages.
International Preliminary Report on Patentability for Application No. PCT/EP2016/067308, dated Feb. 15, 2018, 7 pages.
International Preliminary Report on Patentability for Application No. PCT/EP2016/067309, dated Feb. 15, 2018, 7 pages.
International Preliminary Report on Patentability for Application No. PCT/EP2016/067310, dated Feb. 15, 2018, 8 pages.
International Search Report and Written Opinion for PCT Application No. PCT/EP2016/082476, dated Feb. 9, 2017, 8 pages.
International Search Report and Written Opinion for PCT Application No. PCT/EP2016/082477, dated Feb. 22, 2017, 8 pages.
International Preliminary Report on Patentability for Application No. PCT/EP2016/082476, dated Jul. 5, 2018, 7 pages.
International Preliminary Report on Patentability for Application No. PCT/EP2016/082477, dated Jul. 5, 2018, 7 pages.
International Preliminary Report on Patentability for Application No. PCT/EP2017/055081, dated Oct. 11, 2018, 9 pages.
International Preliminary Report on Patentability for Application No. PCT/EP2017/055082, dated Oct. 11, 2018, 8 pages.
International Preliminary Report on Patentability for Application No. PCT/EP2017/055090, dated Oct. 11, 2018, 10 pages.
International Preliminary Report on Patentability for Application No. PCT/EP2017/055091, dated Oct. 11, 2018, 9 pages.
International Preliminary Report on Patentability for Application No. PCT/EP2017/055094, dated Oct. 11, 2018, 8 pages.
International Search Report and Written Opinion for Application No. PCT/EP2015/074970, dated Jan. 25, 2016, 11 pages.
International Search Report and Written Opinion for Application No. PCT/EP2015/080244, dated Mar. 24, 2016, 9 pages.
International Search Report and Written Opinion for Application No. PCT/EP2015/080246, dated Mar. 14, 2016, 10 pages.
International Search Report and Written Opinion for Application No. PCT/EP2016/067309, dated Nov. 3, 2016, 9 pages.
International Search Report and Written Opinion for Application No. PCT/EP2016/067310, dated Sep. 22, 2016, 9 pages.
International Search Report and Written Opinion for Application No. PCT/EP2017/055081, dated Apr. 7, 2017, 11 pages.
International Search Report and Written Opinion for Application No. PCT/EP2017/055082, dated Apr. 26, 2017, 9 pages.
International Search Report and Written Opinion for Application No. PCT/EP2017/055090, dated Jun. 14, 2017, 12 pages.
International Search Report and Written Opinion for Application No. PCT/EP2017/055091, dated Apr. 11, 2017, 11 pages.
International Search Report and Written Opinion for Application No. PCT/EP2017/055094, dated May 15, 2017, 10 pages.
International Search Report and Written Opinion for Application No. PCT/EP2017/055095, dated Apr. 11, 2017, 10 pages.
International Search Report and Written Opinion for Application No. PCT/EP2017/069272, dated Feb. 20, 2018, 13 pages.
International Search Report and Written Opinion for Application No. PCT/US2017/046927, dated Oct. 13, 2017, 13 pages.
International Search Report and Written Opinion for PCT Application No. PCT/EP2016/067308, dated Sep. 21, 2016, 8 pages.
International Preliminary Report on Patentability for Application No. PCT/EP2017/055095, dated Oct. 11, 2018, 8 pages.
Lavin, et al., "Evaluating Real-time Anomaly Detection Algorithms, the Numenta Anomaly Benchmark," available from Cornell University Library (citation archive:1510.03336) https://arxiv.org/ftp/arxiv/papers/1510/1510.03336.pdf, retrieved on Mar. 28, 2018, Numenta, Inc., Redwood City, CA, USA, Oct. 9, 2015, 8 pages.
Miller A., "The State-of-the-Art of Smart Contracts," FinTech R&D Innovation Conference, Luxemburg, Jan. 19, 2016, Retrieved from URL: http://wwwfr.uni.lu/snt/news_events/speaker_s_presentations on Sep. 29, 2016, 29 pages.
Munoz-Gonzalez, "Exact Inference Techniques for the Dynamic Analysis of Bayesian Attack Graphs," Imperial college, London, Oct. 2015, 14 pages.
Numenta, "Biological and Machine Intelligence (BAMI), A living book that documents Hierarchical Temporal Memory (HTM)," Numenta, Inc., Mar. 8, 2017, retrieved on Mar. 28, 2018 from https://numenta.com/assets/pdf/biological-and-machine-intelligence/BAMIComplete.pdf, 69 pages.
Numenta, "Hierarchical Temporal Memory including HTM Cortical Learning Algorithms," Version 0.2.1, Numenta, Sep. 12, 2011, 68 pages.
Numenta, "Sparse Distributed Representations," (Numenta, available from https://numenta.com/assets/pdf/biological-and-machine-intelligence/BaMISDR.pdf and accessed on Mar. 29, 2017, retrieved on Mar. 28, 2018, 15 pages.
Olshausen, et al., "Sparse Coding with an Overcomplete Basis Set, A Strategy Employed by VI?," Olshausen, B.A., Field, D.J., 1997, Vision Research, 37:3311-3325) retrieved on Mar. 28, 2018 from http://www.chaos.gwdg.de/michael/CNScourse_2004/papersmax/OlshausenFieldl997.pdf, Dec. 24, 1996, 15 pages.
OPNET Technologies Network Simulator I Riverbed, retrieved from https://www.riverbed.com/products/steel central/opnet.html ?redirect=opnet on Jun. 28, 2018, 5 pages.
Plohmann D., et al., "Case study of the Miner Botnet," 4TH International Conference on Cyber Conflict, Jun. 5, 2012, pp. 345-360.
Purdy S., "Encoding Data for HTM Systems," Available from Cornell University Library (citation arXiv: 1602.05925), retrieved on Mar. 28, 2018 from https://arx.iv.org/ftp/arx.iv/papers/1602/1602.05925.pdf, Numenta, Inc., Redwood City, California, USA, Feb. 2016, 11 pages.
Rosenfeld M., "Overview of Colored Coins," https:1/bravenewcoin.com/assets/Whitepapers/Overview-of-Colored-Coins.pdf, Dec. 4, 2012, 13 pages.
Search Report for Great Britain Application No. 1614013.9, dated Feb. 3, 2017, 4 pages.
Search Report for Great Britain Application No. 1614016.2, dated Feb. 3, 2017, 5 pages.
Search Report for Great Britain Application No. 1614018.8, dated Feb. 7, 2017, 7 pages.
Shah S.Y., et al., "Price Based Routing for Event Driven Prioritized Traffic in Wireless Sensor Networks," Apr. 29-May 1, 2013, IEEE 2nd Network Science Workshop, XP032487185, 8 pages.
Skybox Security; Cybersecurity Management & Analytics retrieved from https://www.skyboxsecurity.com/ on Jul. 12, 2018, 7 pages.
Sood A.K., et al., "An Empirical Study of HTTP-based Financial Botnets," IEEE Transactions on Dependable and Secure Computing, IEEE Service Center, New York, NY, US, vol. 13 (2), Mar. 2016, pp. 236-251.
Tschorsch F., et al., "Bitcoin and Beyond: A Technical Survey on Decentralized Digital Currencies," International Association for Cryptologic Research, May 15, 2015, pp. 1-37.
Wang Z., "The Applications of Deep Learning on Traffic Identification," 2012, Advances in Neural Information Processing Systems, 2015, 10 pages.
Wikipedia, "Blockchain (database)—Wikipedia," Nov. 29, 2015, retrieved from https://en.wikipedia.org/w/index.php?title=Block_chain_(database)&oldid=692921608 on Nov. 13, 2018, pp. 1-5.
Application and Filing Receipt for U.S. Appl. No. 15/541,089, filed Jun. 30, 2017, Inventor(s): El-Moussa et al.
Application and Filing Receipt for U.S. Appl. No. 15/541,128, filed Jun. 30, 2017, Inventor(s): El-Moussa et al.

(56) References Cited

OTHER PUBLICATIONS

U.S. Appl. No. 16/319,391, filed Jan. 21, 2019, Inventors: El-Moussa et al.
Application and Filing Receipt for U.S. Appl. No. 16/065,637, filed Jun. 22, 2018, Inventor(s): El-Moussa et al.
U.S. Appl. No. 15/677,288, filed Aug. 15, 2017, Inventor(s): El-Moussa et al.
U.S. Appl. No. 15/677,298, filed Aug. 15, 2017, Inventor(s): El-Moussa et al.
U.S. Appl. No. 15/677,312, filed Aug. 15, 2017, Inventor(s): El-Moussa et al.
U.S. Appl. No. 15/677,322, filed Aug. 15, 2017, Inventor(s): El-Moussa et al.
U.S. Appl. No. 15/677,336, filed Aug. 15, 2017, Inventor(s): El-Moussa et al.
U.S. Appl. No. 15/677,363, filed Aug. 15, 2017, Inventor(s): El-Moussa et al.
Application and Filing Receipt for U.S. Appl. No. 16/065,665, filed Jun. 22, 2018, Inventor(s): El-Moussa et al.
Application and Filing Receipt for U.S. Appl. No. 15/521,964, filed Apr. 26, 2017, Inventor(s): El-Moussa et al.
International Search Report and Written Opinion for corresponding PCT Application No. PCT/EP2017/068738 dated Oct. 9, 2017; 13 pages.
Fischer, et al.; "Training Restricted Boltzmann Machines: An Introduction", vol. 47, No. 1, Jun. 7, 2013, 27 pages.
International Preliminary Report on Patentability for Application No. PCT/EP2017/068738, dated Feb. 28, 2019, 10 pages.
Office Action dated Mar. 29, 2019 for U.S. Appl. No. 16/065,665, 27 pages.
Office Action dated Jul. 30, 2019 for U.S. Appl. No. 16/065,665, 27 pages.
Response to Jul. 30, 2019 Office Action, U.S. Appl. No. 16/065,665, filed Oct. 30, 2019, 10 pages.
Response to Mar. 29, 2019 Office Action for U.S. Appl. No. 16/065,665, filed Jun. 28, 2019, 9 pages.

* cited by examiner

FIGURE 6

| | DNS allowed | Email allowed | Admin allowed to read file | OS Windows 7 | OS Windows 8.1 | HTTP allowed | Registry change allowed | SSH allowed |
|---|---|---|---|---|---|---|---|---|
| Malware running | | ■ | | ■ | | | | |
| Connection to malicious site | ■ | | | | | ■ | | |
| Automatic Redirection | | | ■ | | ■ | | | |
| Change in System Files | | ■ | | ■ | | | ■ | ■ |
| Connection to Darknet | ■ | | | | | | | ■ |
| SQL Injection | | | | | | ■ | | |

FIGURE 9

| VM ID | VM Configuration Features | Attack Features |
|---|---|---|
| VM1 | DNS allowed; HTTP allowed; Registry Change Allowed; OS Windows 8 | Connection to malicious site; Automatic redirection |
| VM1 | E-mail allowed; HTTP allowed; Admin allowed to read file; OS Windows 7 | Malware running; Change in system files |

| Set | Features |
|---|---|
| {X} | {DNS allowed; HTTP allowed; Registry Change Allowed; E-mail allowed; Admin allowed to read file; OS Window 7; OS Windows 8} |
| {A} | {Connection to malicious site; Automatic redirection; Malware running; Change in system files} |

FIGURE 10

| | | | 160a | 160b |
|---|---|---|---|---|
| 126 | {A} | Change in system files | 0 | 1 |
| | | Malware running | 0 | 1 |
| | | Automatic redirection | 0 | 0 |
| | | Connection to malicious site | 1 | 0 |
| 124 | {X} | OS Windows 8 | 1 | 0 |
| | | OS Windows 7 | 1 | 1 |
| | | Admin allowed to read file | 0 | 1 |
| | | Email allowed | 0 | 1 |
| | | Registry Change Allowed | 1 | 0 |
| | | HTTP allowed | 1 | 1 |
| | | DNS Allowed | 1 | 0 |
| | | | VM1 | VM2 |

| | Email allowed | Windows 8 OS | Windows 10 OS | FTP allowed | DNS redirection permitted | HTTP allowed | Directory write access permitted | Database Server Admin Access Permitted | Admin Login Permitted | Superuser Privilege Permitted | Firewall Installed |
|---|---|---|---|---|---|---|---|---|---|---|---|
| Malware | ■ | | ■ | ■ | ■ | ■ | ■ | | ■ | ■ | |

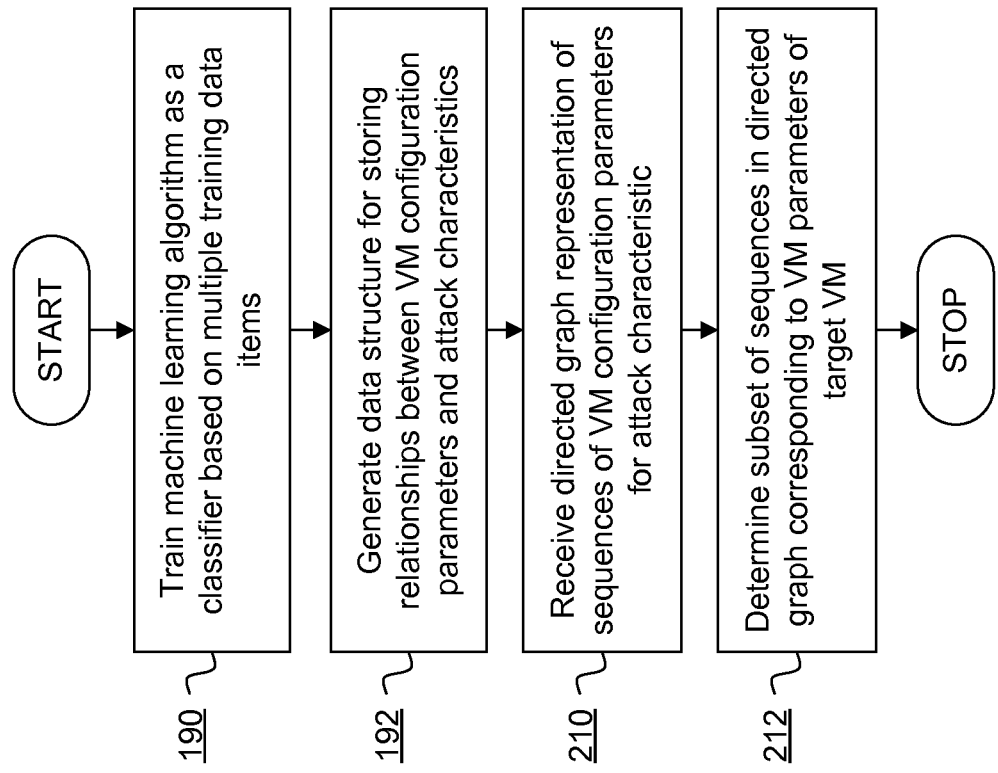
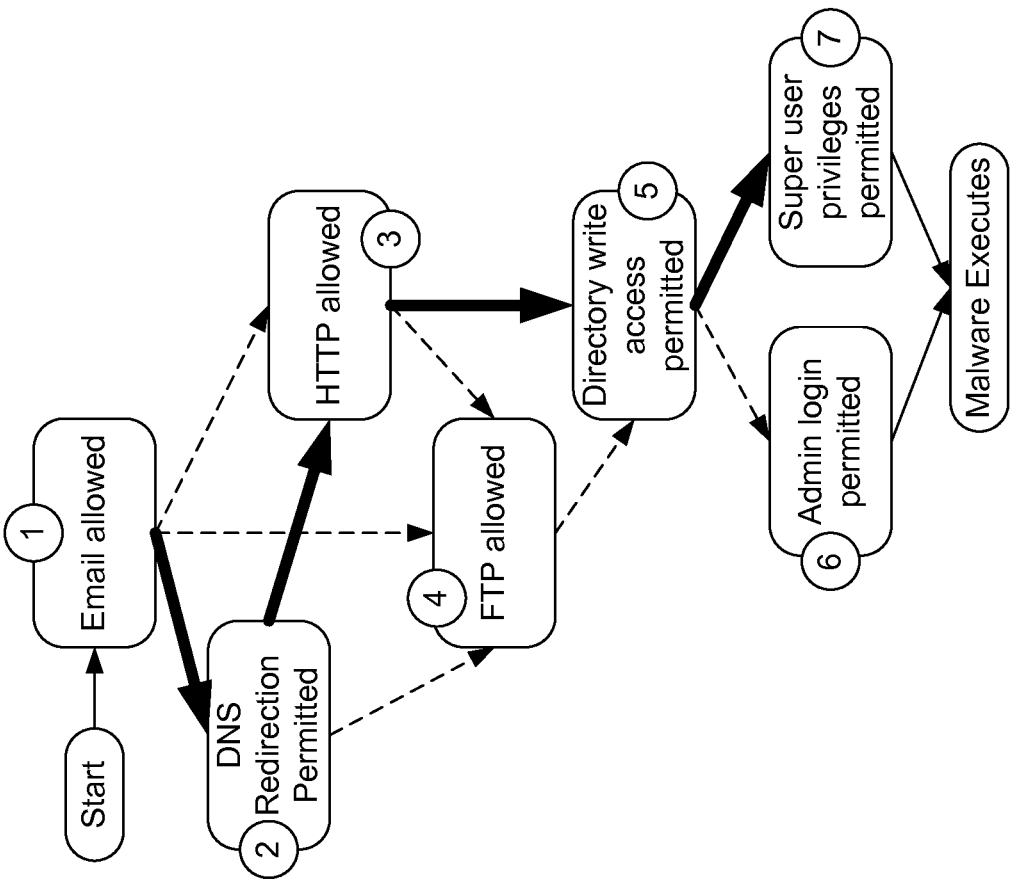

RECONFIGURED VIRTUAL MACHINE TO MITIGATE ATTACK

CROSS-REFERENCE TO RELATED APPLICATION

The present application is a National Phase entry of PCT Application No. PCT/EP2017/068738, filed Jul. 25, 2017, which claims priority from EP Patent Application No. 16184383.4 filed Aug. 16, 2016 each of which is hereby fully incorporated herein by reference.

TECHNICAL FIELD

The present disclosure relates to the detection of computer security threats.

BACKGROUND

Computer systems such as virtual machines (VMs) executing in virtualized computing environments (VCEs) such as cloud computing environments may look like any physical, networked or standalone computer system such as a personal computing device and are therefore equally susceptible to any kind of cyber-attack if not properly protected. For example, a VM may become infected by malware communicated via network communication or when a user opens an infected email attachment or connects to malicious websites. Once a VM is infected it may become part of a group of collectively controlled systems such as a "botnet" for use by an adversary or hacker to coordinate further cyber-attacks on other systems communicatively connected to compromised systems, such as via the Internet.

SUMMARY

Thus there is a need to protect such virtualized computer systems from such attacks.

The present disclosure accordingly provides, in a first aspect, a computer implemented method to mitigate a security attack against a target virtual machine (VM) in a virtualized computing environment, the target VM having a target VM configuration including configuration parameters, and the security attack exhibiting a particular attack characteristic, the method comprising: training a machine learning algorithm as a classifier based on a plurality of training data items, each training data item corresponding to a training VM and including a representation of parameters for a configuration of the training VM and a representation of characteristics of security attacks for the training VM; generating a first data structure for storing one or more relationships between VM configuration parameters and attack characteristics, wherein the first data structure is generated by sampling the trained machine learning algorithm to identify the relationships; receiving a second data structure storing a directed graph representation of one or more sequences of VM configuration parameters for achieving the particular attack characteristic of the security attack, the VM parameters in the directed graph being determined based on the first data structure; identifying VM parameters of the target VM used in the security attack as a subset of sequences in the directed graph corresponding to VM parameters of the target VM; and reconfiguring the target VM by changing at least one of the identified VM parameters so as to stop the attack.

In some embodiments each of the attack characteristics has associated a protective measure, the method further comprising, in response to the identification of an attack characteristic to which the target VM is susceptible, implementing the protective measure so as to protect the VM from attacks having the attack characteristic.

In some embodiments the machine learning algorithm is a restricted Boltzmann machine.

In some embodiments the characteristics of security attacks include an indication of the consequence of a security attack executing in the training VM.

In some embodiments each training data item comprises a vector of binary values indicating each indicating a presence or absence of a configuration feature and an attack characteristic of a corresponding training VM.

In some embodiments the data structure is a matrix data structure for mapping VM configuration parameters against attack characteristics.

In some embodiments the restricted Boltzmann machine includes a plurality of hidden units and a plurality of visible units, and sampling the trained machine learning algorithm includes generating sample inputs for the hidden units to determine values of the visible units.

In some embodiments each generated sample input is a vector of binary values wherein each binary value is determined using a randomization algorithm.

In some embodiments each protective measure is a configuration parameter or a change to a configuration parameter for a VM to protect against an attack characteristic.

The present disclosure accordingly provides, in a second aspect, a computer system including a processor and memory storing computer program code for performing the method set out above.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which:

FIG. 6 illustrates a matrix mapping VM configuration features against attack features in an exemplary embodiment of the present disclosure.

FIG. 9 illustrates the determination of an aggregate set of VM configuration features {X} and an aggregate set of attack features {A} in an exemplary embodiment of the present disclosure.

FIG. 10 illustrates exemplary input vectors for a restricted Boltzmann machine based on the features of FIG. 9.

FIG. 22 illustrates a subset of sequences in the directed graph of FIG. 20 corresponding to VM parameters of the VM of FIG. 21 in accordance with an exemplary embodiment of the present disclosure.

FIG. 23 is a flowchart of a method to identify configuration parameters of a target VM used in a security attack against the target VM in accordance with embodiments of the present disclosure.

DETAILED DESCRIPTION

Figure 1:
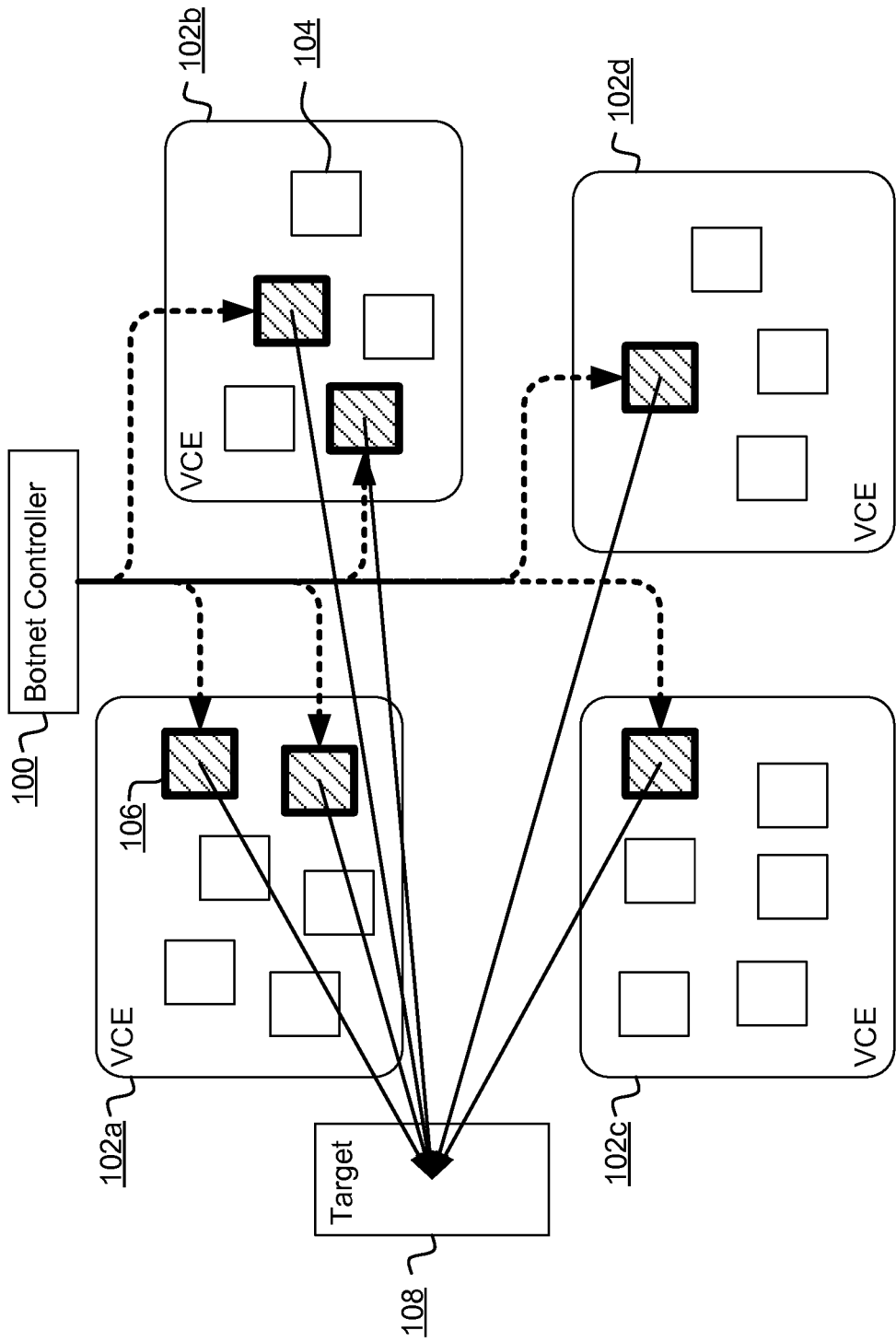
FIG. 1 is a block diagram illustrating computer systems executing in virtualized computing environments under control of a botnet controller.

One example of an attack employing compromised VMs is coordinated by a "botnet controller"—known as "Command and Control" (C&C)—which may control a number of infected machines (any of which may be physical, virtual, cloud-hosted or standalone machines) to launch different kinds of attack. FIG. 1 is a block diagram illustrating computer systems 106 executing in VCEs 102a to 102d under control of a botnet controller 100. FIG. 1 shows an example scenario where the botnet controller 100 controls a number of VMs 106 (shown hatched) hosted in potentially different VCEs 102a to 102d to launch one or more attacks on a target computer system 108. Such an attack can include a distributed denial of service (DDoS) attack on the target 108. Notably the network communication between infected VMs and the controller 100 may not employ a direct connection and may be routed via other machines including other infected machines.

In order to protect a VM from becoming compromised by a malicious attack and potentially infected and/or recruited into a botnet a user (or system administrator) needs to apply appropriate security measures such as, inter alia, installing up-to-date anti-malware software, configuring firewalls to block suspicious network communication, and/or apply latest security patches for an operating system etc. Additionally, a user must be vigilant when opening emails from unknown sources or accessing data, files or software communicated via a network such as the internet. While such measures can provide protection in general, it may not be sufficient to protect against more sophisticated attacks or zero-day attacks that are relatively unknown. There is also a lack of security knowledge among many users which can lead to non-optimal configuration of security software (e.g. firewall) or unsafe access to materials via a network (e.g. unsafe browsing, not being aware of unsecure network connections such as non-HTTPS connections, etc.). In particular, for cloud-hosted machines cloud providers frequently employ VM or system templates to assist users in deploying new VMs. Leaving a VM configuration at least partly in a default, template or original state can pose a security risk since a potential adversary may have knowledge of such a default configuration and may be able to exploit any vulnerability in a deployed VM to compromise it.

Embodiments of the present disclosure seek to addresses the security issues of virtualized computing environments such as cloud computing environments by obtaining configuration and/or security related features from VMs, combining them with detected attack characteristics and/or an absence of attack information and applying a machine learning approach to determine whether or not a particular VM may be susceptible to attack.

Figure 2:
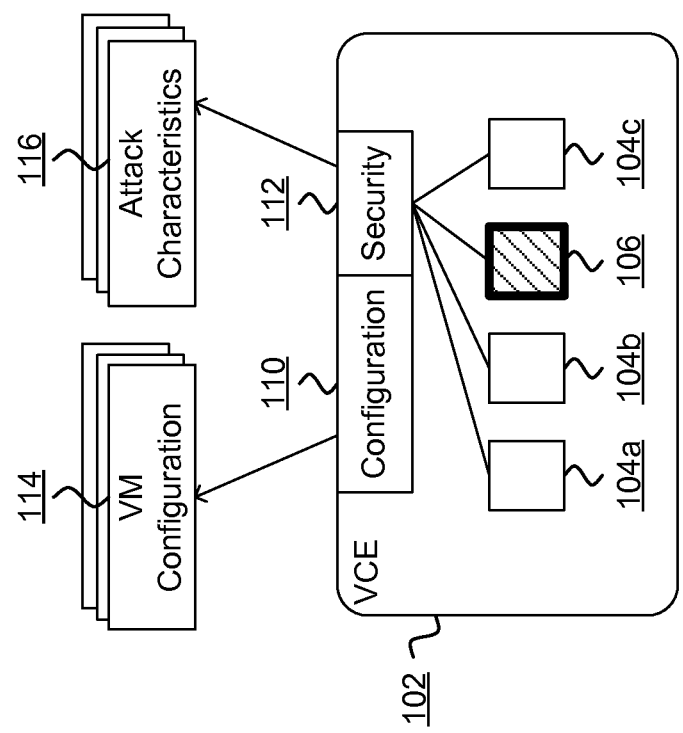
FIG. 2 is a block diagram of a virtualized computing environment in accordance with embodiments of the present disclosure.

FIG. 2 is a block diagram of a virtualized computing environment 102 in accordance with embodiments of the present disclosure and shows an example implementation of an embodiment of the present disclosure. The arrangement of FIG. 2 includes one of potentially many VCEs 102 each hosting one or more infected VMs 106 among a population of VMs 104a to 104c. The virtualized computing environment 102 is a system for executing one or more virtualized computer systems in a local, distributed or hybrid manner. Such virtualization can be achieved using virtualization facilities such as one or more hypervisors or the like. Such virtualization provides a separation between a computer system implementation and physical hardware with which computer systems execute. Such computer systems are typically VMs such as VMs 104a to 104c and VM 106. Distributed or remotely hosted virtualized environments can provide computer systems as VMs for use, access or consumption by consuming entities. An example of such an arrangement is a cloud hosted VCE.

Infected VMs 106 are controlled by a botnet controller 100 such as to launch an attack campaign. Infected VMs 106 can be part of multiple or different botnets, i.e. controlled by different botnet controllers. VCEs may physically be located in different geographical areas, may be managed by a single or more service providers. In each VCE a service provider manages configuration information 110 and security information 112. Configuration information 110 is information relating to a configuration of one or more VMs executing in the VCE 102. The configuration information may be specific to a VM or apply to multiple VMs and includes an identification and/or definition or resources and/or configurations deployed for a VM. For example, via the configuration information 110 configuration parameters of each VM can be identified including, inter alia: Operating system identification; Network topology; VPN configuration; DNS settings; Email configuration; a Security configuration, e.g. Antivirus, Firewall, etc. Thus the configuration information 110 is suitable for defining one or more VM characteristics 114 for VMs in the VCE.

The security information 112 is information relating to one or more security facilities of the VCE 102 and/or individual VMs deployed therein. In particular, the security information includes information sufficient to determine characteristics of any attack(s) that have occurred in a VM in the VCE such as, inter alia: an indication of the execution of malware; an indication of unauthorized changes to system files; a connection to a known illicit, malicious or unsecure network such as "darknet"; and other such attack characteristics as will be apparent to those skilled in the art and that can be identified and recorded by security services such as security software. For example, the security information 112 can include information including, inter alia, information from VCE-wide security sensors, i.e. IDS (Intrusion Detection System), Firewall, Web-Proxy, etc. The security information 112 provides characteristics 116 or features of successful attacks on any VM within the VCE, such as: Attack type, e.g. Virus, Trojan, etc.; Attack method, e.g. SQL injection, XSS, etc.; IP domain; Used ports, protocols or user agents, etc. Thus the security information 112 is suitable for defining one or more attack characteristics 116 for VMs in the VCE. In some embodiments the security information 112 is specific to each of one or more VMs 104, 106 and can be obtained, stored, handled and/or managed by such VMs individually.

Figure 3:
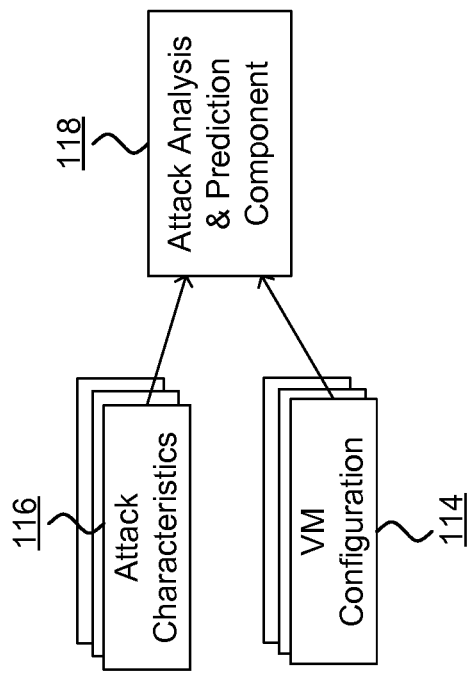
FIG. 3 is a block diagram of a computer system suitable for the operation of embodiments of the present disclosure.

FIG. 3 is a block diagram of a computer system suitable for the operation of embodiments of the present disclosure. A central processor unit (CPU) 302 is communicatively connected to a storage 304 and an input/output (I/O) interface 306 via a data bus 308. The storage 304 can be any read/write storage device such as a random access memory (RAM) or a non-volatile storage device. An example of a non-volatile storage device includes a disk or tape storage device. The I/O interface 306 is an interface to devices for the input or output of data, or for both input and output of data. Examples of I/O devices connectable to I/O interface 306 include a keyboard, a mouse, a display (such as a monitor) and a network connection.

Figure 4:
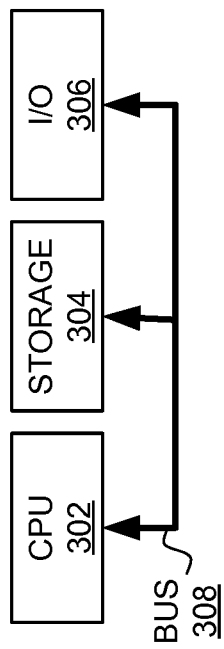
FIG. 4 illustrates an arrangement of an attack analysis and assessment component in accordance with embodiments of the present disclosure.

FIG. 4 illustrates an arrangement of an attack analysis and assessment component 118 in accordance with embodiments of the present disclosure. The attack analysis and assessment component of FIG. 4 is a hardware, software, firmware or combination component for the analysis of the attack characteristics 116 and the configuration characteristics 114 to determine if a VM is susceptible to attack. Thus the attack analysis and assessment component 118 is operable to analyze configuration characteristics 114 and attack characteristics 116 and employs a feature extraction mechanism, such as latent factor extraction by machine learning, to determine associations between configuration characteristics 114 and attack characteristics 116. Further, in some embodiments the attack analysis and assessment component 118 is operable to determine one or more attack characteristics for attacks to which a particular VM configuration is vulnerable based on the identified latent factors. Further, in some embodiments, the attack analysis and assessment component 118 is operable to determine one or more recommendations for VM configuration to mitigate attacks having one or more attack characteristics.

As illustrated in FIG. 4 both configuration characteristics 114 and attack characteristics 116 are received or accessed by the attack analysis and assessment component 118 as input. The attack analysis and assessment component 118 produces a set of one or more associations between these characteristics following a learning phase. The inputs may come from multiple VCEs such as VCEs managed by a single cloud provider. Subsequently the associations determined by the attack analysis and assessment component 118 can be employed to determine whether or not a VM with particular configuration is susceptible to an attack having certain attack characteristics. Yet further the associations can be employed to one or more VM configurations suitable for mitigating a particular type of attack.

Figure 5:
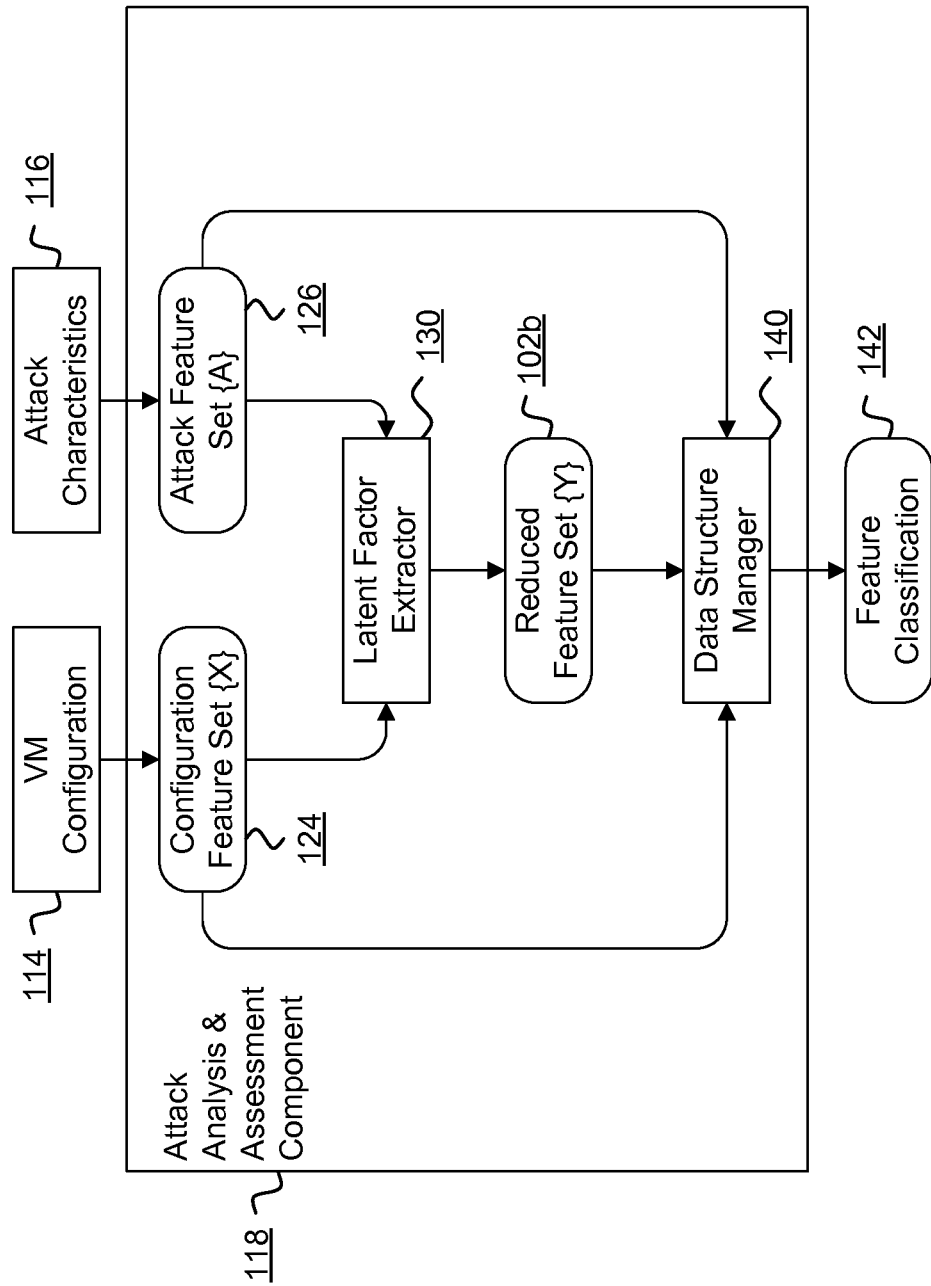
FIG. 5 is a block diagram of the attack analysis and assessment component of FIG. 4 in accordance with embodiments of the present disclosure.

FIG. 5 is a block diagram of the attack analysis and assessment component 118 of FIG. 4 in accordance with embodiments of the present disclosure. The attack analysis and assessment component 118 includes a latent factor extractor 130 and a data structure manager 140, each of which is a software, hardware, firmware or combination component.

The latent factor extractor 130 is a component for identifying latent factors in a set of binary vectors such as a machine learning algorithm. For example, the latent factor extractor 130 can employ a restricted Boltzmann machine as described below. Latent factors (or latent variables) are features that are not directly observed in the binary vectors but that can be inferred such as through a mathematical model from the binary vectors. In particular, latent factors can be used to identify associations between the elements in binary vectors by, for example, categorizing binary vectors.

The data structure manager 140 is a component for generating a data structure as a feature classification 142 that classifies latent factors to identify and recognize associations between aspects of the latent factors as will be explained in detail below.

The attack analysis and assessment component 118 receives or accesses configuration characteristics 114 and attack characteristics 116 for each of a plurality of VMs to generate each of a configuration feature set {X} 124 and an attack feature set {A} 126 respectively. Configuration feature set {X} consists of elements each corresponding to a configuration feature of a VM. Similarly, attack feature set {A} consists of elements each corresponding to a feature of a successful attack against the VM. For each VM the configuration features {X} and attack features {A} are combined together as input to the latent factor extractor 130. The combine sets {{X}, {A}} for each of multiple VMs are used as training data for the latent factor extractor 130. Following all training based on input sets {X} and {A} for multiple VMs the latent factor extractor 130 generates, as an output, a reduced set of features {Y} representing learned underlying latent factors. Notably, the features set {Y} is not necessarily a subset of features in all of the feature sets {X}.

The feature sets {X}, {A} and {Y} are subsequently used by the data structure generator 140 to generate a data structure classifying configuration features, i.e. subsets of {X}, that are indicated as permitting particular classes of attack (i.e. types of attack or attack scenarios). The mappings between the relevant configuration parameters and attack characteristics can be represented in an association data structure such as the matrix 142 depicted in FIG. 6.

FIG. 6 illustrates a matrix 142 mapping VM configuration features 152 against attack features 150 in an exemplary embodiment of the present disclosure. As can be seen from the exemplary data structure of FIG. 6, the attack feature "Changes in System files" occurred on VMs that, for example, have "Admin Allowed to read files", "Registry change allowed" and "SSH Allowed". Thus the set of reduced features {Y} permits the identification of associations between configuration features 152 and attack features 150. Notably the attack features are not specific attacks but rather classes or types of attack (e.g. an attack that involves executing malware is a class of attack, not a specific malware attack).

Thus from the data structure 142 it is possible to determine a configuration of a VM that may be susceptible to particular classes of attack. Equally, it is possible to determine configurations of VM that are indicated to be less susceptible to particular classes of attack. Accordingly, on the basis of the reduced set of features determined by learning of the latent factor extractor 130 an indication of susceptibility of a VM configuration can be evaluated, and further a configuration or modifications to a configuration of a VM can be determined. Thus in some embodiments a component implemented as hardware, software, firmware or a combination component such as monitoring agents instantiated with, within or in association with one or more VMs and in communication with an attack analysis and assessment component 118 according to FIG. 5 and/or a feature classification 142 such as the data structure of FIG. 6 is operable to one or more of: determine or have determined whether a VM is susceptible to a class of attack based on its configuration; modify a VM configuration to mitigate or reduce susceptibility to one or more classes of attack; and/or generate a VM configuration for mitigating or reducing susceptibility to one or more classes of attack.

Figure 7:
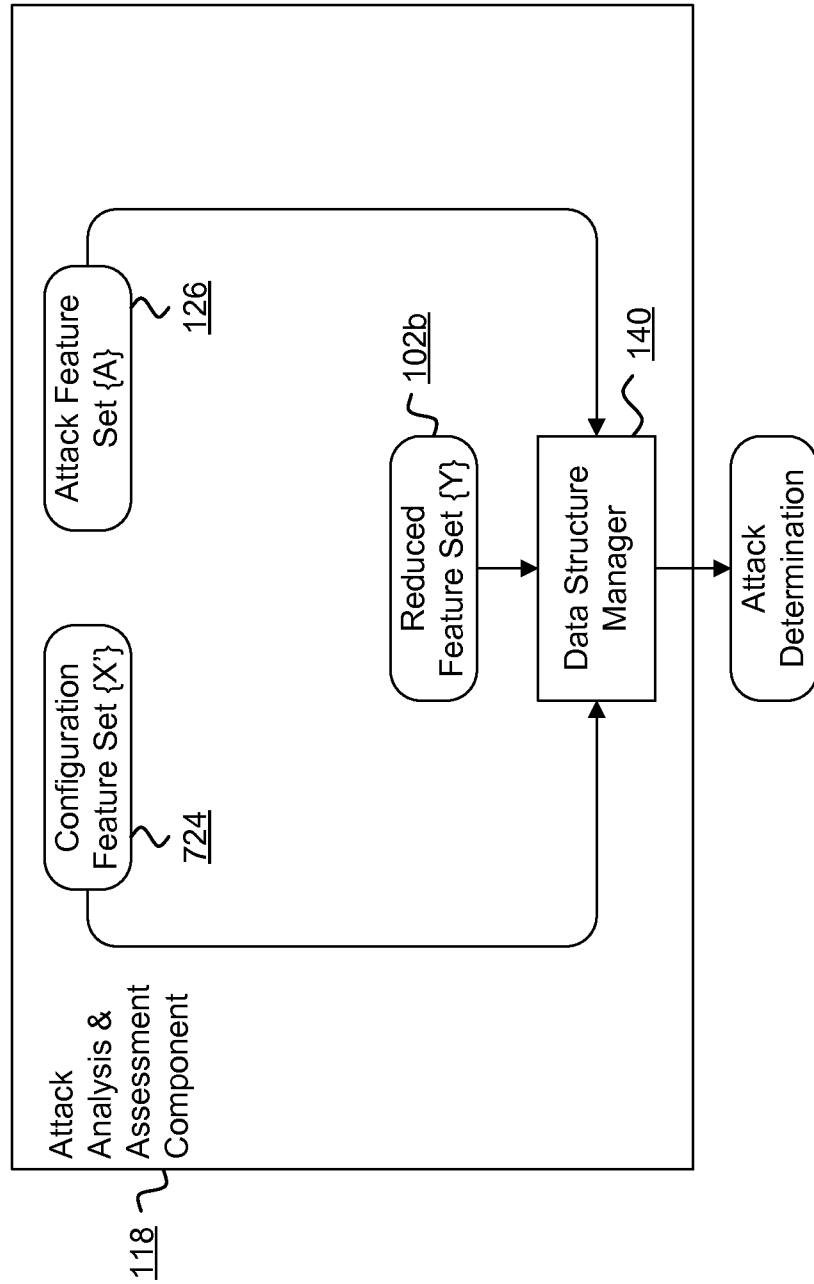
FIG. 7 illustrates a further arrangement of the attack analysis and assessment component of FIG. 4 in accordance with embodiments of the present disclosure.

FIG. 7 illustrates a further arrangement of the attack analysis and assessment component 118 of FIG. 4 in accordance with embodiments of the present disclosure. Given a particular uninfected VM with a set of configuration parameters, denoted as features set {X'}, the classification process will make use of the outcome from an earlier training phase (i.e. trained algorithms defining a reduced set of features {Y}) in conjunction with a set of detected attack features {A} in order to assess whether or not there will be an attack at the VM. In the following an exemplary implementation of an attack analysis and assessment component 118 using Restricted Boltzmann Machine as its machine learning algorithm is described.

Figure 8:
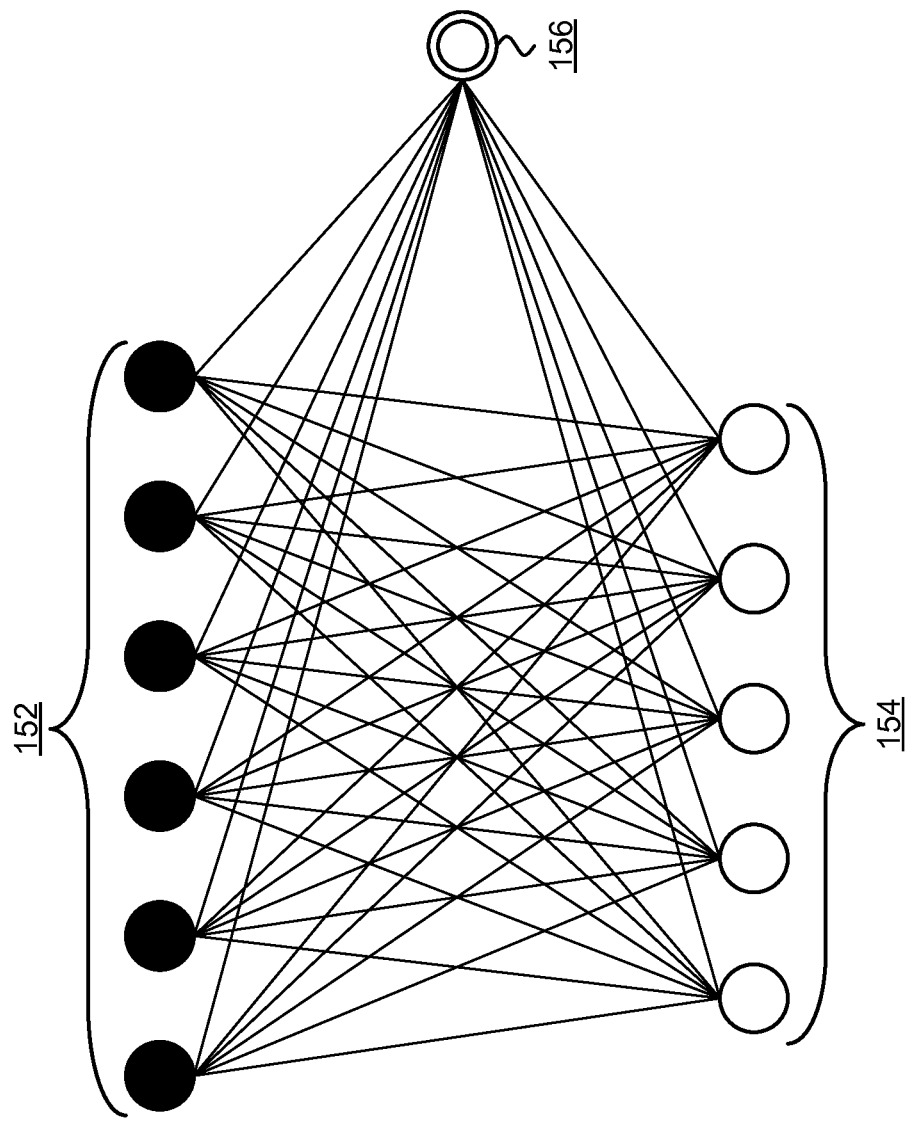
FIG. 8 illustrates a restricted Boltzmann machine for use in exemplary embodiments of the present disclosure.

FIG. 8 illustrates a restricted Boltzmann machine for use in exemplary embodiments of the present disclosure. A restricted Boltzmann Machine (RBM) is a stochastic neural network, i.e. a network of neurons where each neuron has some random behavior when activated. It consists of one layer of visible units 152, one layer of hidden units 154 and a bias unit 156. Each visible unit is connected to all the hidden units (this connection is undirected, so each hidden unit is also connected to all the visible units), and the bias unit 156 is connected to all the visible units and all the hidden units. The bias unit 156 is used to allow other units to learn an appropriate threshold. No visible unit is connected to any other visible unit and no hidden unit is connected to any other hidden unit. After successful learning, an RBM provides a closed-form representation of the distribution underlying the training data.

In embodiments of the present disclosure the latent feature extractor 130 includes an RBM as a classifier where the RBM is trained to model a joint probability distribution of inputs (features set {X} of VM configuration features based on VM characteristics 114) and corresponding labels (features set {A} of attack features based on attack characteristics 116), both represented by the visible units of the RBM. The hidden units represent a reduced set of features {Y} that, after training, can constitute a set of latent factors. The RBM works by updating states of some units given the states of others. A unit can have a binary state: state 0 (false—not activated); or state 1 (true—activated). Hence the VM configuration features and attack features can be represented as a binary vector.

For example, a set of features {X} for VM configuration features can include binary indications of the following features:
DNS allowed
Email allowed
Admin allowed to read file
OS is Window 7.0
HTTP allowed For example, a set of detected attack features {A} for a VM can include binary indications of the following features:
Malware running
Connection to malicious sites detected
Automatic redirection
Change in system files Prior to training the RBM a set of management features {X} and attack feature {A} for an entire training data set need to be determined. It is necessary to determine the aggregate set of VM configuration features and attack features for the plurality of VMs in the training data set in order to determine a size of a required binary vector and, accordingly, a number of visible units for the RBM. For example, training data can consist of configuration features for a plurality of VMs with confirmed attack features. This means that there will be different sets of VM configuration parameters and attack characteristics for different VMs. Some of the configuration parameters are shared among the VMs and some are not. The same also applies to the attack features. Therefore, when a complete set of features {X} is passed to an RBM's visible units for a single VM, some visible units will activate (indicating features that are present in the set {X}, such as by binary '1' indication) and some will not (features that are absent in the set {X}, such as by binary '0' indication).

FIG. 9 illustrates the determination of an aggregate set of VM configuration features {X} and an aggregate set of attack features {A} in an exemplary embodiment of the present disclosure. While only two VMs are indicated in FIG. 9 it will be appreciated by those skilled in the art that more training data will lead to an RBM having a better capability to identify classifications for input data. Thus, in FIG. 9, a first VM VM1 has a set of configuration features that differs from that of a second VM VM2, and further VM1 exhibits different attack features to VM2. The aggregate set of all possible configuration features is indicated as set {X} and includes seven possible features, so set {X} includes binary vectors having seven elements each thus: [0,0,0,0,0, 0,0]. Further, the aggregate set of all possible attack features is indicated as set {A} and includes four possible features, so set {A} includes binary vectors having four elements thus: [0,0,0,0]. The number of visible units in the RBM is the sum of the number of features {X} and the number of features {A} and binary feature vectors for training the RBM will each be constituted as eleven element vectors comprising {{X}, {A}} thus: [0,0,0,0,0,0,0,0,0,0,0]. A number of hidden units can be determined during an RBM training phase to achieve an acceptable level of accuracy—a greater number of hidden units offering a wider diversity of classifications but fewer discrete classes (i.e. a larger set {Y}) while a smaller number of hidden units focuses classification on fewer classes but can lose subtle latent factors (i.e. a smaller set {Y}). The selection of an appropriate number of hidden units is thus a matter of tuning to achieve a desirable classification.

FIG. 10 illustrates exemplary input vectors 160a and 160b for an RBM based on the features of FIG. 9. FIG. 10 shows how the features of VM1 and VM2 can be prepared for input as visible units to train the RBM, each vector 160a and 160b constituting an item of training data and the collective of all vectors constituting the training data set.

Additionally, in some embodiments the configuration features of VMs which are confirmed to not have suffered any attack or infection can optionally be provided as further training data by mapping into an input binary vector for visible units with the corresponding attack feature vector being set to all zeros or false (to indicate no attack). Such an approach provides non-attacked VM configurations to the RBM to support the RBM in learning how to classify potentially safely-configured VMs.

Thus the RBM is trained with example features from infected and non-infected VMs input as inputs to the visible units. The objective of the training process is for the RBM to learn connection weights between the units, i.e. visible, hidden and bias. The training can be performed using an algorithm known as "Contrastive Divergence Learning" such as is described in Geoffrey Hinton's paper "A Practical Guide to Training Restricted Boltzmann Machines" (Aug. 2, 2010; University of Toronto Department of Computer Science). In summary contrastive divergence involves performing a number of iterations to compute states of hidden units based on states of visible units and vice versa, where the states of visible units are reconstructed from the hidden units. A number of iterations increases with learning steps to achieve improved accuracy. A number of hidden units is estimated at the start of learning phase and may be adapted to achieve better accuracy.

The trained RBM constitutes a model for the joint probability distribution of all inputs consisting of features sets {X} and {A}. The model is mainly represented by the computed weights of the connections between visible (v) and hidden (h) units/neurons. The distribution function p(v,h) is determined by the activation energy function E(v,h) defined by the model. p(v,h) is close to 1 for large positive activation energies, and p(v,h) close to 0 for negative activation energies. Units that are positively connected to each other try to get each other to share the same state (i.e., be both on or off), while units that are negatively connected to each other are enemies that prefer to be in different states. This behavior can also be used to determine a susceptibility to attack in embodiments of the present disclosure.

Figure 11:
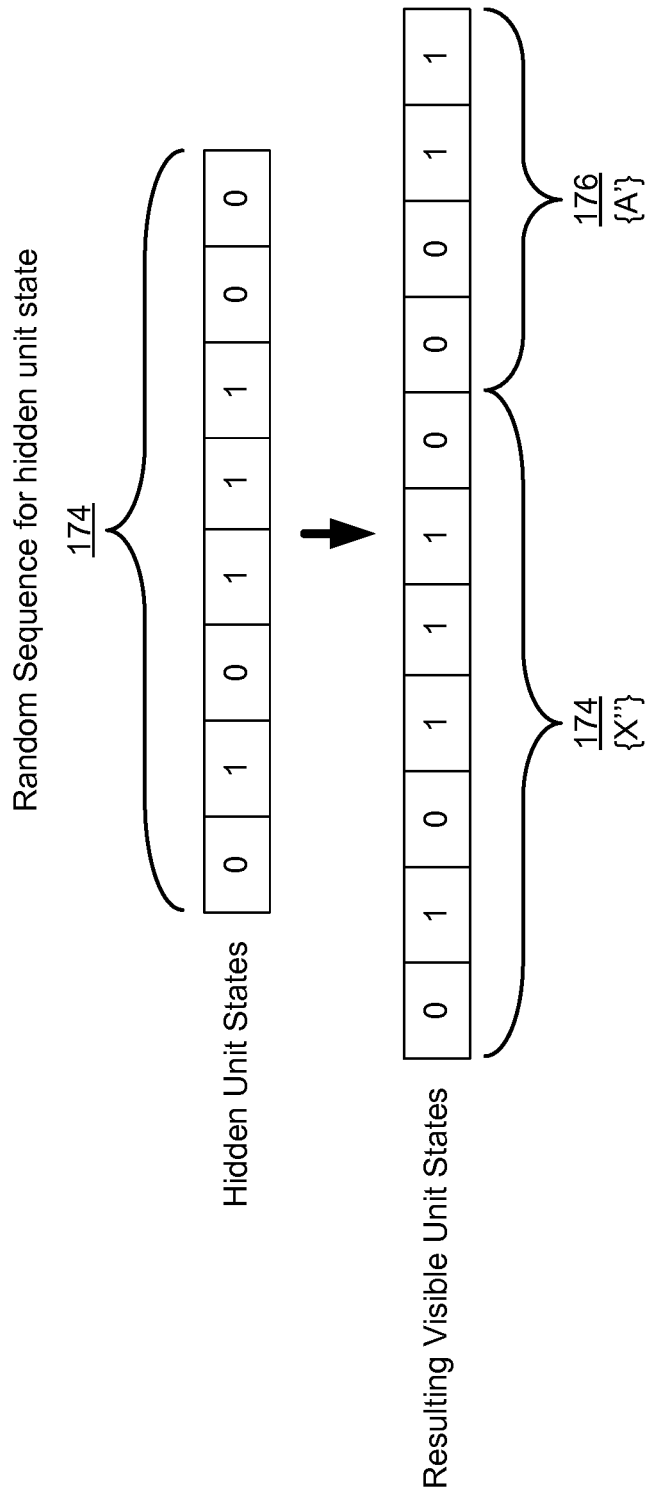
FIG. 11 illustrates states of hidden and visible units of a restricted Boltzmann machine as part of a sampling process in an exemplary embodiment of the present disclosure.

Following training of the RBM the data structure manager 140 subsequently generates the feature classification data structure 142 such as a matrix, table or the like such as the matrix illustrated in FIG. 6. A classification process is employed using the features sets {X}, {A} and the reduced set {Y} (or hidden units) of the trained RBM. The feature classification data structure 142 can be generated through sampling of visible units in the RBM based on hidden having randomly defined activation states. Thus FIG. 11 illustrates states of hidden and visible units of a restricted Boltzmann machine as part of a sampling process in an exemplary embodiment of the present disclosure. The process can be summarized as:

1. A random sequence 174 for states of the hidden units is generated.
2. The hidden units are input to the trained RBM hidden units.
3. The RBM generates a number of samples of visible units.
4. The sampled visible units are extracted to configuration features set {X"} and attack features set {A'}.
5. The new features sets {X"} and {A'} are then mapped to an m×n matrix (m and n are the lengths of features sets {X'} and {A'}, respectively). In some embodiments, only sampled visible units with one or more non-zero values of attack features set {A'} are considered for inclusion in the matrix.
6. The whole sampling process is repeated multiple times with new random sequences 174 at step 1 to build a comprehensive hotspot matrix.

The resulting data structure (matrix) can subsequently be employed for: reconstructing possible attack scenarios for compromising a VM; determining a susceptibility of a VM configuration to an attack scenario; and determining a VM configuration for mitigating or reducing a susceptibility to an attack scenario.

Figure 12:
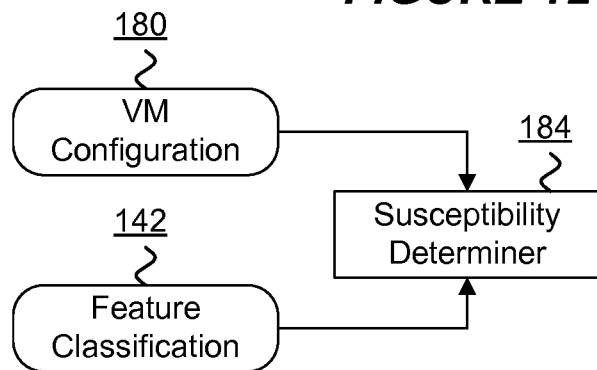
FIG. 12 is a component diagram illustrating an arrangement including a susceptibility determiner component for determining whether a target VM is susceptible to a security attack based on a pre-existing VM configuration for the target VM in accordance with some embodiments of the present disclosure.

FIG. 12 is a component diagram illustrating an arrangement including a susceptibility determiner 184 component for determining whether a target VM is susceptible to a security attack based on a pre-existing VM configuration 180 for the target VM in accordance with some embodiments of the present disclosure. The susceptibility determiner 184 is a hardware, software, firmware or combination component for determining susceptibility of the target VM to attack. The susceptibility determiner accesses a feature classification 142 generated according to the techniques hereinbefore described. For example, the feature classification 142 can comprise a matrix, table or other data structure such as the matrix of FIG. 6. The susceptibility determiner 184 further accesses the pre-existing VM configuration 180 for the target VM to determine if the target VM is susceptible to a security attack. The attack can be a particular attack being associated with one or more attack characteristics on which bases the feature classification 142 is defined. Alternatively, the attack can be identified directly in terms of one more attack features in the classification 142. The susceptibility determiner 184 thus uses the VM configuration for the target VM to identify attack characteristics identified in the feature classification 142 to which the target VM is susceptible. In this way attack characteristic susceptibility of the target VM can be determined and remediation or protective measures can be employed.

For example, each attack characteristic can have associated one or more protective measures such, inter alia: a configuration parameter or change to a configuration parameter for a VM to protect against attacks exhibiting a particular characteristic, such as disabling DNS redirection, restricting access to certain resources such as files or directories, closing certain network ports, and the like; and/or an additional function, routine, facility, service or other resource suitable for detecting and/or protecting against attacks exhibiting a particular characteristic, such as anti-malware software, intrusion detection facilities, proxies and firewalls and the like.

Thus, in this way embodiments of the present disclosure provide for the determination of susceptibility of a target VM to security attacks. The susceptibility can be quantified such as a degree of susceptibility and remediation or protective measures or deployment determinations for the target VM can be based on the determined degree of susceptibility.

Figure 13:
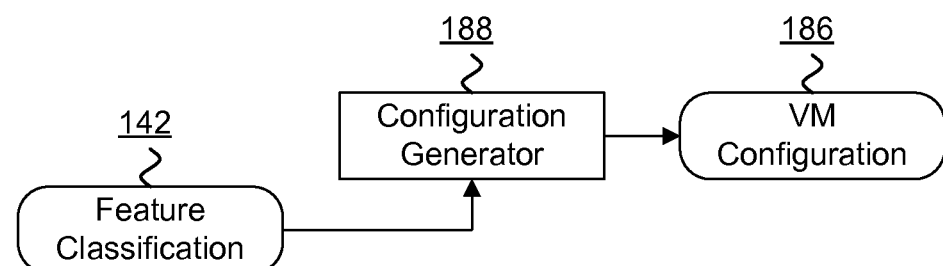
FIG. 13 is a component diagram illustrating an arrangement including a configuration generator for determining a configuration of a target VM to protect against a security attack exhibiting a particular attack characteristic in accordance with some embodiments of the present disclosure.

FIG. 13 is a component diagram illustrating an arrangement including a configuration generator 188 for determining a configuration 186 of a target VM to protect against a security attack exhibiting a particular attack characteristic in accordance with some embodiments of the present disclosure. The configuration generator 188 is a hardware, software, firmware or combination component for generating the VM configuration 186. The configuration generator 188 accesses a feature classification 142 generated according to the techniques hereinbefore described. For example, the feature classification 142 can comprise a matrix, table or other data structure such as the matrix of FIG. 6. Furthermore, the configuration generator 188 can receive an identification of one or more attack characteristics to from which the target VM is intended to be protected. Alternatively, the configuration generator 188 can be configured to generate a VM configuration 186 that protects against substantially all, or a majority of, or a subset of attack characteristics indicated in the feature classification 132. Where protection is provided against a subset the subset may be determined based on, for example, a prioritization of attach characteristics or an assessment of attack characteristics relevant to a particular VM based on one or more software components to be executed by the VM or use case definition for the VM. Thus, in use, the configuration generator 188 inspects the feature classification 142 to determine configuration parameters for the target VM that are not associated with attack characteristics that the VM is to be protected from. In this way a VM configuration can be generated that serves to reduce a susceptibility of the target VM to attacks having particular attack characteristics.

It will be appreciated by those skilled in the art that protection against attacks exhibiting a particular attack characteristic need not provide a guarantee of absolute avoidance or removal of attacks with such characteristics, rather protection seeks to reduce susceptibility, mitigate and/or avoid such attacks.

Figure 14:
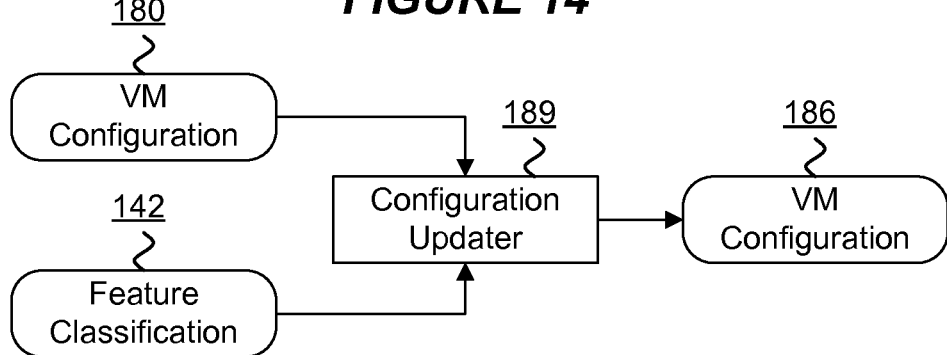
FIG. 14 is a component diagram illustrating an arrangement including a configuration updater for determining a configuration of a VM to protect against a security attack exhibiting a particular attack characteristic and updating a pre-existing VM configuration for a target VM to protect against attacks having the attack characteristic based on the determined configuration in accordance with some embodiments of the present disclosure.

FIG. 14 is a component diagram illustrating an arrangement including a configuration updater 189 for determining a configuration of a VM to protect against a security attack exhibiting a particular attack characteristic and updating a pre-existing VM configuration 180 for a target VM to protect against attacks having the attack characteristic based on the determined configuration in accordance with some embodiments of the present disclosure. The manner of operation of the updater 189 of FIG. 14 is similar to that of the configuration generator 188 of FIG. 13 except that the updater 189 is further adapted to access the pre-existing VM configuration 180 and update the configuration 180 in view configuration parameters determined to protect against certain attack characteristics based on the feature classification to generate an updated or replacement VM configuration 186 for the target VM.

Figure 15:
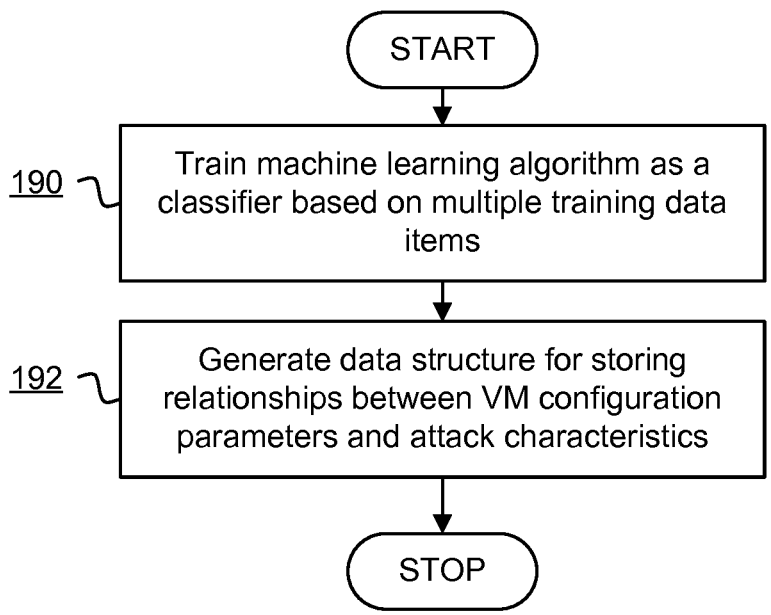
FIG. 15 is a flowchart of a method to generate a classification scheme for configuration parameters of VMs in accordance with some embodiments of the present disclosure.

FIG. 15 is a flowchart of a method to generate a classification scheme for configuration parameters of VMs in accordance with some embodiments of the present disclosure. Initially, at 190, a machine learning algorithm is trained as a classifier based on a plurality of training data items, each training data item corresponding to a training VM and including a representation of parameters for a configuration of the training VM and a representation of characteristics of security attacks for the training VM. Subsequently, at 192, a data structure is generated for storing one or more relationships between VM configuration parameters and attack characteristics. The data structure is generated by sampling the trained machine learning algorithm to identify the relationships.

Figure 16:
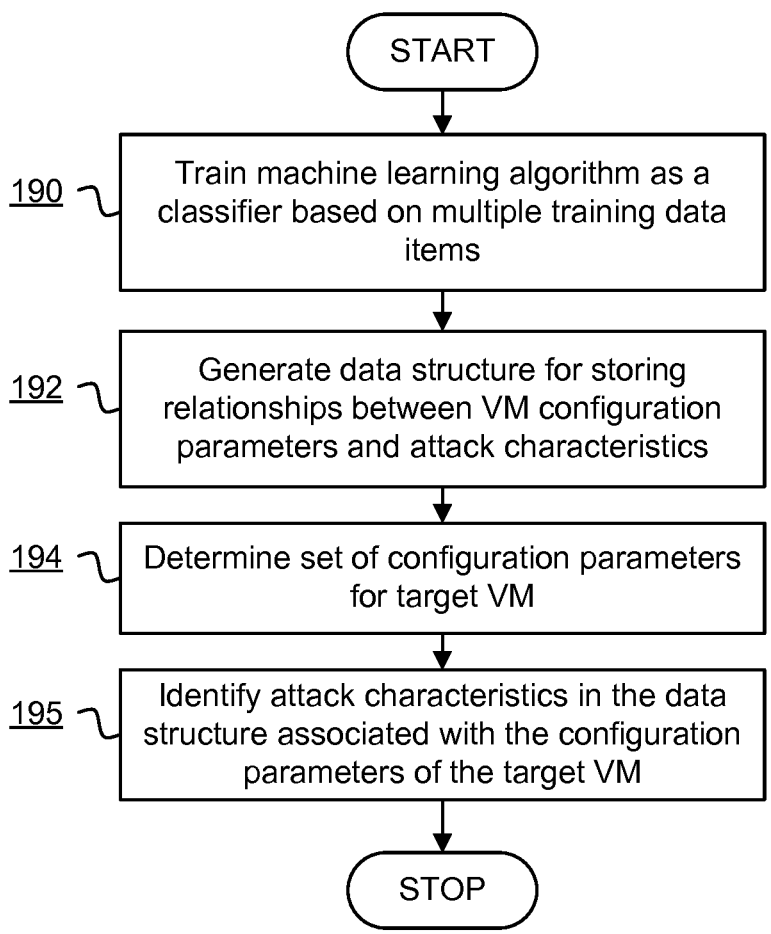
FIG. 16 is a flowchart of a method to determine whether a target VM is susceptible to a security attack in accordance with some embodiments of the present disclosure.

FIG. 16 is a flowchart of a method to determine whether a target VM is susceptible to a security attack in accordance with some embodiments of the present disclosure. The activities at 190 and 192 are substantially as described above with respect to FIG. 15. Subsequently, at 194, a set of configuration parameters for the target VM are determined. At 195 attack characteristics in the data structure associated with configuration parameters of the target VM are identified as characteristics of attacks to which the target VM is susceptible.

Figure 17:
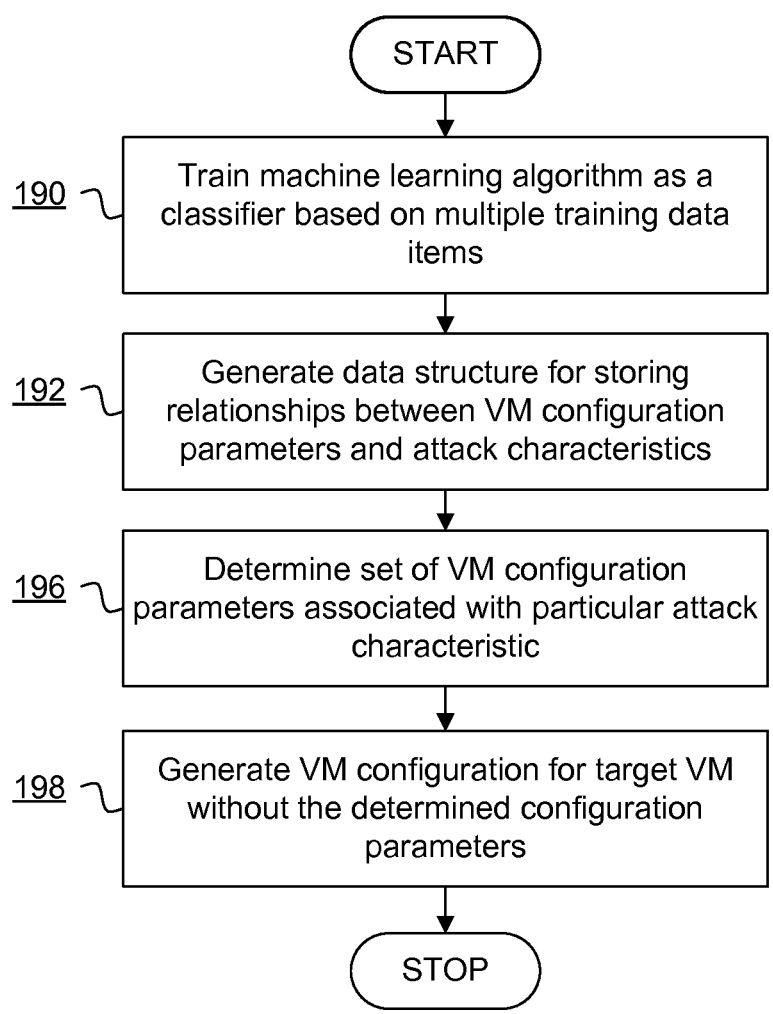
FIG. 17 is a flowchart of a method to determine a configuration of a target VM to protect against a security attack exhibiting a particular attack characteristic in accordance with some embodiments of the present disclosure.

FIG. 17 is a flowchart of a method to determine a configuration of a target VM to protect against a security attack exhibiting a particular attack characteristics in accordance with some embodiments of the present disclosure. The activities at 190 and 192 are substantially as described above with respect to FIG. 15. Subsequently, at 196, the particular attack characteristic in the data structure are identified to determine a set of VM configuration parameters indicated as associated with the particular attack characteristic. At 198 a VM configuration is generated for the target VM wherein the configuration parameters in the determined set of VM configuration parameters are absent in the generated VM configuration.

Figures 18, 19:
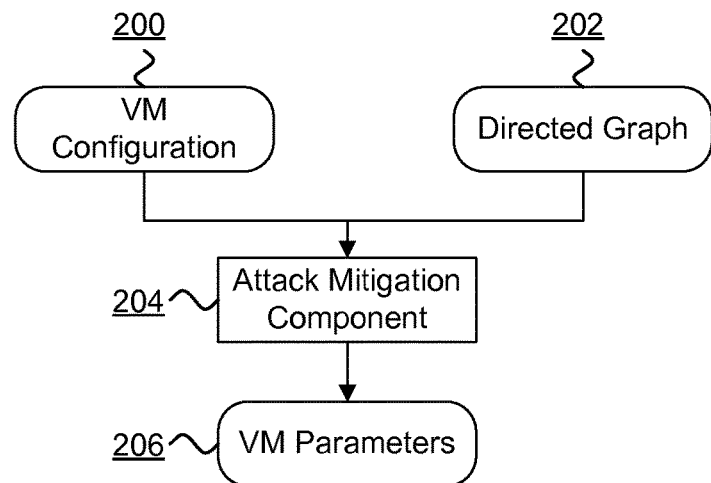
FIG. 18 is a component diagram of an arrangement for attack mitigation in accordance with embodiments of the present disclosure.
FIG. 19 illustrates an exemplary entry in a feature classification data structure for a malware attack characteristic in accordance with an exemplary embodiment of the present disclosure.

FIG. 18 is a component diagram of an arrangement for attack mitigation in accordance with embodiments of the present disclosure. An attack mitigation component 204 is provided as a hardware, software, firmware or combination component for mitigating an attack against a target VM where the attack exhibits one or more particular attack characteristics. The attack mitigation component 204 thus accesses a VM configuration 200 for the target VM and a directed graph data structure 202. The directed graph data structure 202 is predefined based on the feature classification 142 generated by the attack analysis and assessment component 118. The directed graph includes vertices representing VM configuration parameters connected by directed edges to form sequences of VM configuration parameters involved in achieving a particular attack characteristic for an attack. In some embodiments the attack mitigation component 204 generates new or modified VM parameters 206 as described below. An exemplary arrangement in respect of an exemplary malware attack characteristic will now be described.

FIG. 19 illustrates an exemplary entry in a feature classification data structure 142 for a malware attack characteristic in accordance with an exemplary embodiment of the present disclosure. The feature classification entry of FIG. 19 is generated by the attack analysis and assessment component 118 following training of a latent feature extractor 130 based on a plurality of training data items as training examples. As can be seen in FIG. 19 an attack characteristic corresponding to the execution of malware in a VM is characterized by a number of VM configuration parameters including: email being permitted; Windows 10 operating system being used; file transfer protocol (FTP) being permitted; hypertext transport protocol (HTTP) being permitted; write access to a file system directory being permitted; administrator-level login being permitted; and superuser privilege being permitted.

Figures 20, 21:
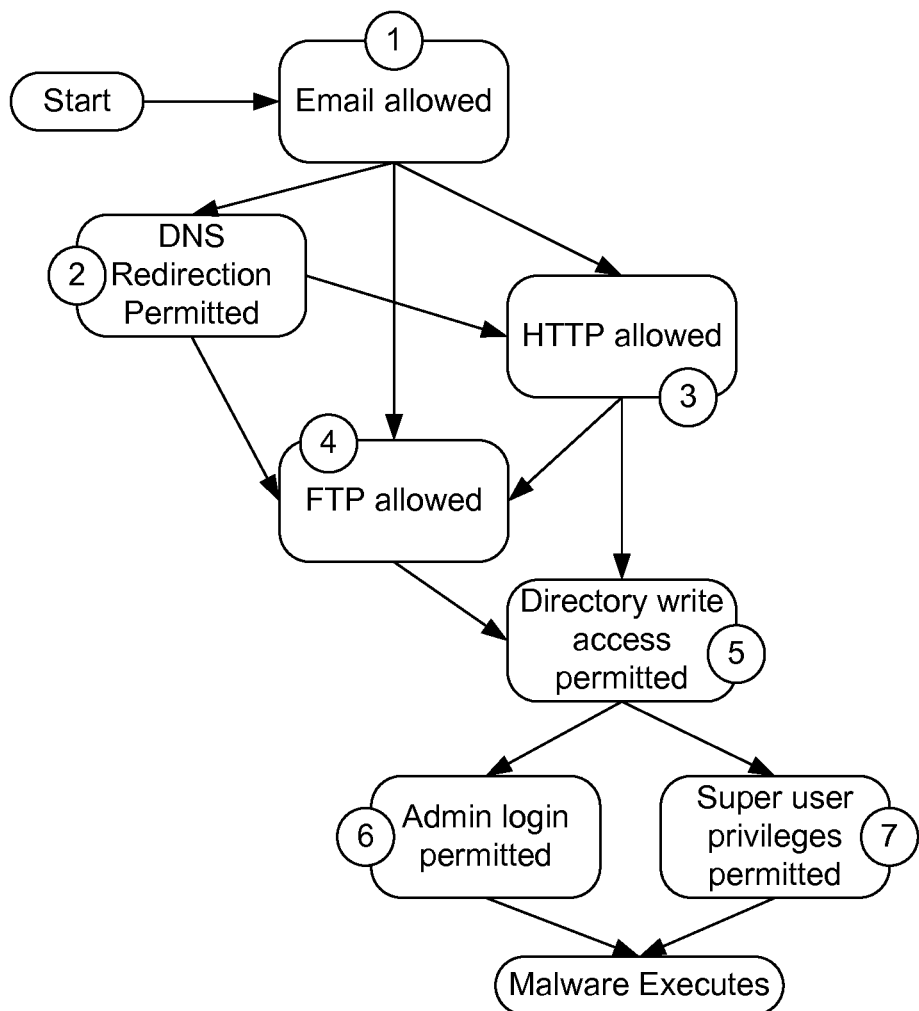
FIG. 20 illustrates a data structure storing a directed graph representation of sequences of VM configuration parameters for the malware attack of FIG. 19 in accordance with an exemplary embodiment of the present disclosure.
FIG. 21 illustrates states of an exemplary configuration of a VM in accordance with the VM configuration parameters of FIG. 19 and in accordance with an exemplary embodiment of the present disclosure.

FIG. 20 illustrates a data structure storing a directed graph representation of sequences of VM configuration parameters for the malware attack of FIG. 19 in accordance with an exemplary embodiment of the present disclosure. The graph of FIG. 19 can be generated by a systems analyst, user or VM administrator and reflects latent knowledge of how the VM configuration parameters identified for the malware attack characteristic in FIG. 19 can be arranged in ordered sequence(s) in order for an attack having such a characteristic to take place. Thus it can be seen in FIG. 20 that sequences start at the "start" vertex and follow sequences through the graph to a final vertex in which "malware executes" is indicated. All sequences start at vertex 1 based on the "email allowed" VM configuration parameter. One sequence proceeds through vertices 2, 4, 5 and 6 representing VM configuration parameters "DNS redirection permitted", "FTP allowed", "directory write access permitted" and "admin login permitted". Alternative sequences through the graph also exist, such as the sequence through vertices 1, 3, 5, 7 corresponding to: "Email allowed", "directory write access permitted", and "super user privileges permitted". Other sequences also exist such as, inter alia: 1, 3, 4, 5, 6; 1, 3, 5, 6; and 1, 2, 3, 5, 6. Thus the directed graph of FIG. 20 represents multiple sequences from the "start" vertex to the "malware executes" vertex with each sequence comprised of a list of VM configuration parameters for achieving the particular attack characteristic. In some embodiments the directed graph is stored as a data structure for access by an attack mitigation component 204, such as data structures well known to those skilled in the art.

FIG. 21 illustrates states of an exemplary configuration of a VM in accordance with the VM configuration parameters of FIG. 19 and in accordance with an exemplary embodiment of the present disclosure. Notably the configuration parameters indicated in FIG. 21 are for one specific VM implementation (as opposed to an entire feature classification 142) though, in the exemplary embodiment, the parameters are defined by a vector of binaries in terms of all possible VM parameters of the feature classification 142 of FIG. 19.

Thus the VM associated with the VM configuration of FIG. 21 exhibits only a subset of the VM configuration parameters of FIG. 19 (for example, not exhibiting "FTP allowed"). The directed graph of FIG. 20 can be used to determine any subset of sequences corresponding to the VM configuration parameters of the VM of FIG. 21. Thus FIG. 22 illustrates a subset of sequences in the directed graph of FIG. 20 corresponding to VM parameters of the VM of FIG. 21 in accordance with an exemplary embodiment of the present disclosure. The subset of sequences is shown by the emphasized continuous arrows in FIG. 22. It can be seen, therefore, that the VM configuration parameters associated with the VM of FIG. 21 do indeed constitute a subset of the sequences indicated by the directed graph and accordingly it can be concluded that the VM is susceptible to an attack exhibiting a malware attack characteristic.

FIG. 23 is a flowchart of a method to identify configuration parameters of a target VM used in a security attack against the target VM in accordance with embodiments of the present disclosure. Initially the method performs 190 and 192 as previously described to generate the feature classification data structure 142. Subsequently, at 210, the method receives a data structure storing a directed graph representation of sequences of VM configuration parameters for achieving an attack characteristic of the security attack. The directed graph is determined based on the feature classification data structure. At 212 the method determines a subset of sequences in the directed graph corresponding to VM parameters of the target VM to identify VM parameters of the target VM used in the security attack. Thus, in this way the method identifies parameters of a configuration of the target VM used in a security attack against the target VM.

Figure 24:
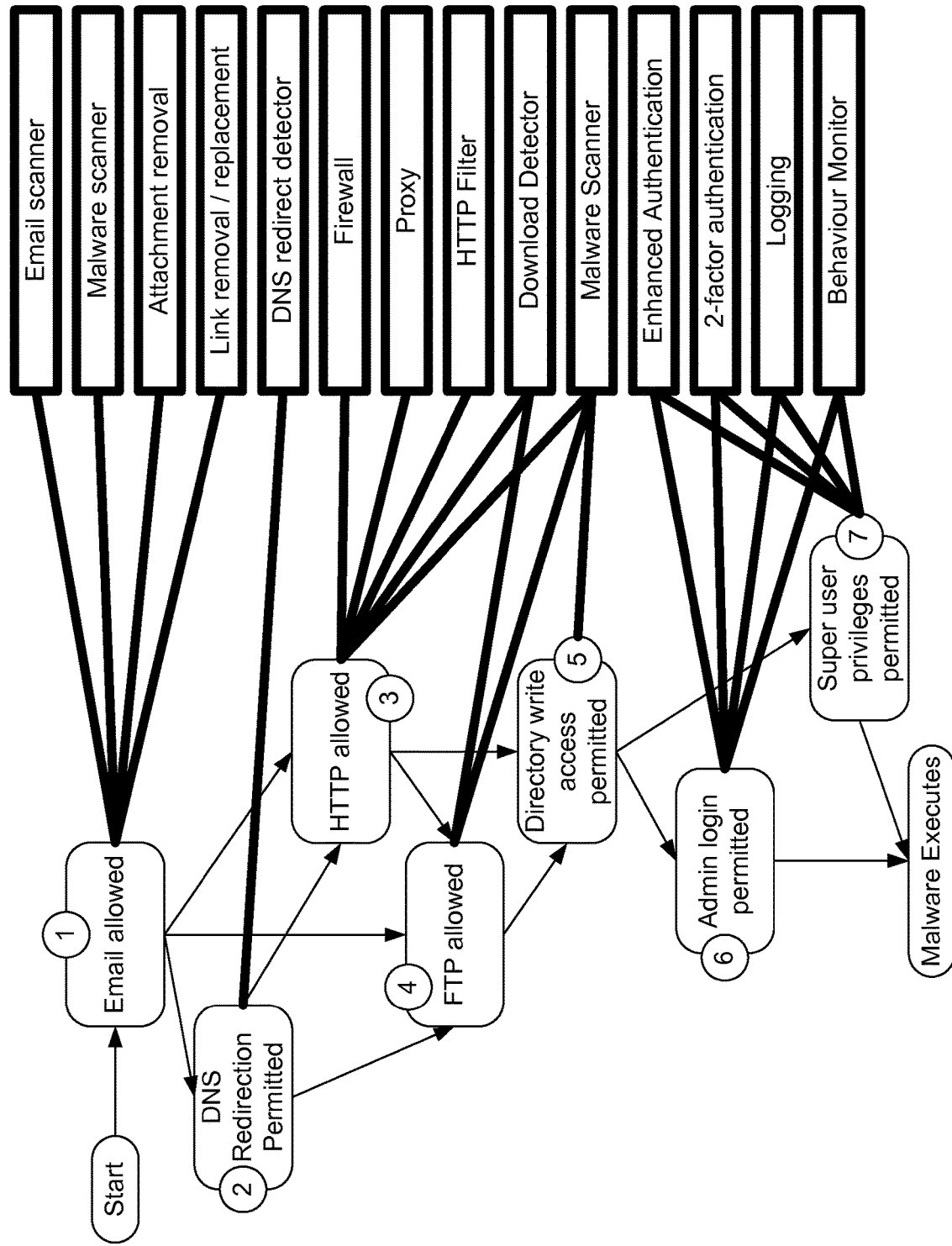
FIG. 24 illustrates exemplary security facilities that can be employed to mitigate the malware attack of FIG. 19 in accordance with an exemplary embodiment of the present disclosure.

Once such VM configuration parameters have been identified then mitigation measures against the security attack can be employed. FIG. 24 illustrates exemplary security facilities that can be employed to mitigate the malware attack of FIG. 19 in accordance with an exemplary embodiment of the present disclosure. Each VM configuration parameter in the directed graph of FIG. 24 has associated one or more security facilities that may be employed to mitigate or protect the VM or to reduce the risk of attack or success of an attack. For example, the "email allowed" parameter can be supplemented by security facilities for: scanning email; scanning for malware in email; removing attachments to emails; and/or removing or replacing links in emails. The "DNS redirection permitted" parameter can be supplemented by security facilities for detecting DNS redirection. The "HTTP allowed" parameter can be supplemented by security facilities such as: a firewall; a proxy; an HTTP filter; a download detector; and a malware scanner. The "FTP allowed" parameter can be supplemented by security facilities for: detecting downloads; and malware scanning. The "directory write access permitted" parameter can be supplemented by security facilities for malware scanning. The "admin login permitted" and "super user privileges permitted" parameters can be supplemented by security facilities for: enhanced authentication; multi-factor such as 2-factor authentication; logging of authentication attempts; and monitoring of the behavior of administrators logged-in.

Figure 25:
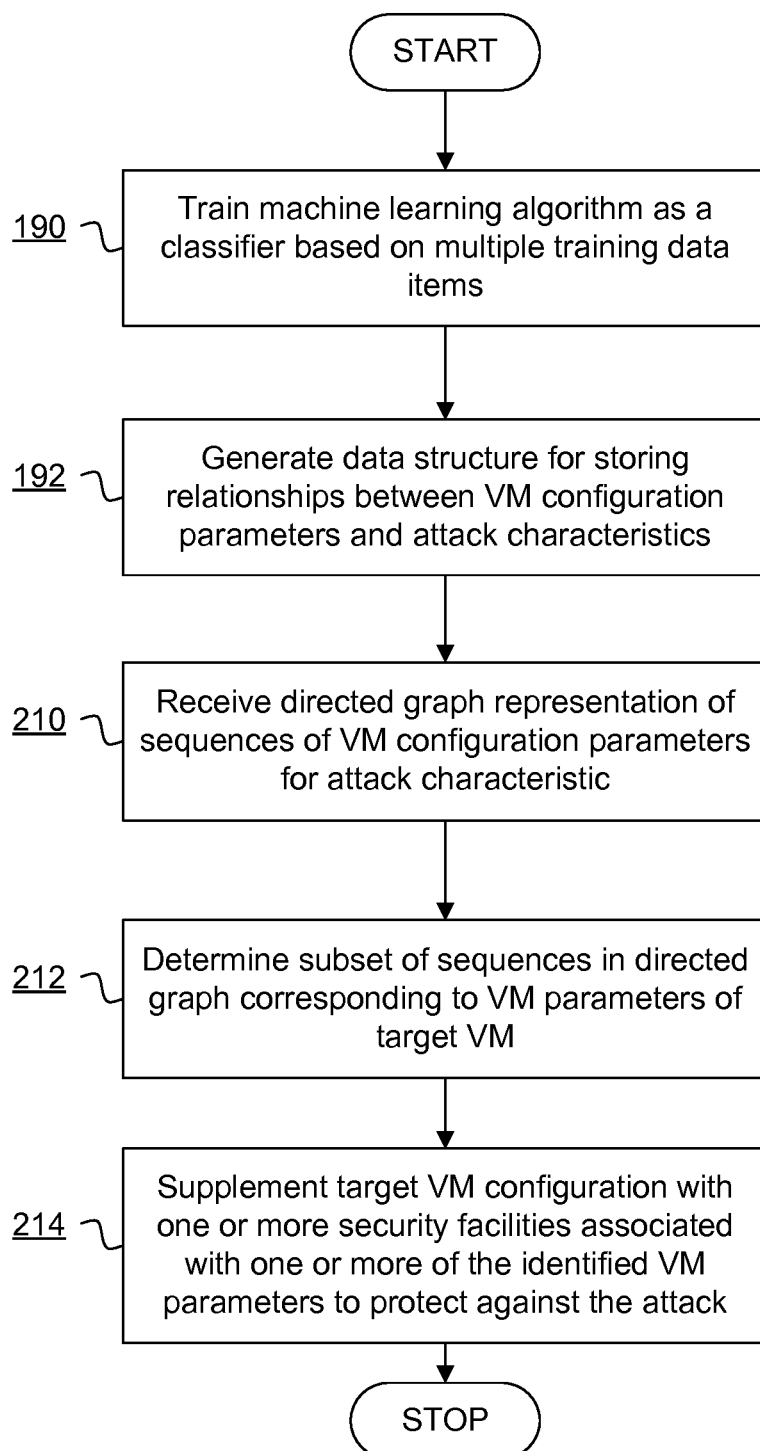
FIG. 25 is a flowchart of a method to mitigate a security attack against a target virtual machine in accordance with embodiments of the present disclosure.

FIG. 25 is a flowchart of a method to mitigate a security attack against a target virtual machine in accordance with embodiments of the present disclosure. Initially the method performs 190, 192, 210 and 212 as previously described. Subsequently, at 214, the target VM configuration is supplemented by one or more security facilities associated with one or more of the VM parameters identified for the target VM. Thus, considering the VM parameters for the VM of FIG. 21 any or all of the security facilities associated with the "email allowed", "DNS redirection permitted", "HTTP allowed", "directory write access permitted", and "super user privileges permitted" may be configured to be applied to the VM to mitigate the malware attack.

Figure 26:
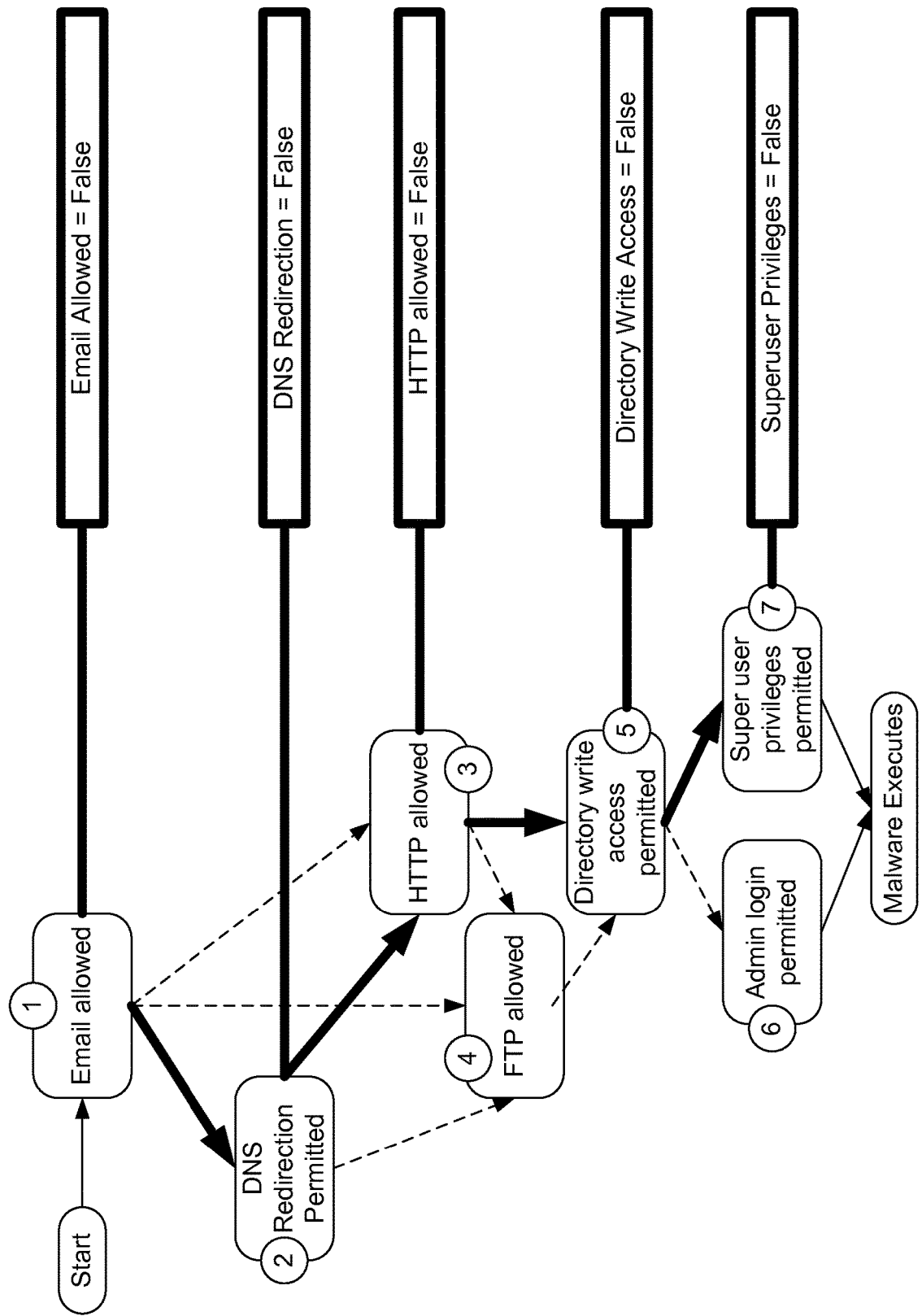
FIG. 26 illustrates exemplary VM configuration parameter changes that can be employed to mitigate the malware attack of FIG. 19 in accordance with an exemplary embodiment of the present disclosure.
Figure 27:
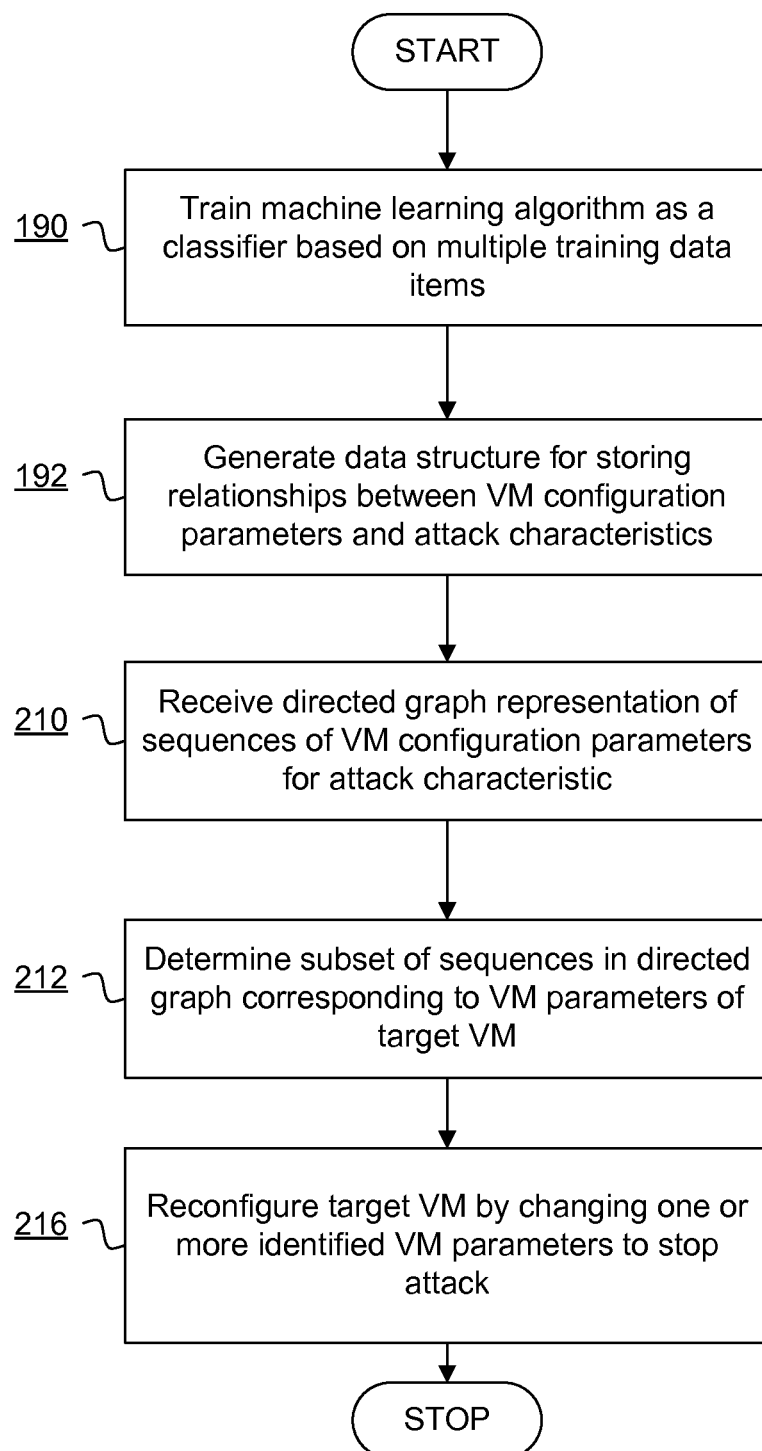
FIG. 27 is a flowchart of a method to mitigate a security attack against a target virtual machine in accordance with embodiments of the present disclosure.

As an alternative to mitigating an attack by the inclusion of security features, modifications to VM configuration parameters themselves may be adopted. FIG. 26 illustrates exemplary VM configuration parameter changes that can be employed to mitigate the malware attack of FIG. 19 in accordance with an exemplary embodiment of the present disclosure. Thus FIG. 26 illustrates how any of the VM configuration parameters of the VM of FIG. 21 may be changed to break the sequence through the directed graph and so mitigate the malware attack. Accordingly, FIG. 27 is a flowchart of a method to mitigate a security attack against a target virtual machine in accordance with embodiments of the present disclosure. Initially the method performs 190, 192, 210 and 212 as previously described. Subsequently, at 216, the method reconfigures the target VM by changing one or more VM parameters identified by directed graph as being included in the sequence of parameters for the attack characteristic.

One challenge remaining with the approach of FIG. 27 is the possibility that an attack with the malware attack characteristic can nonetheless be brought against a VM even when the sequence of parameters for the VM in the directed graph is broken. For example, mitigation of the attack characteristic of FIG. 26 by setting "HTTP allowed=false" could lead to circumvention of the mitigation measure, such as to employ FTP or an alternative communication mechanism.

Figure 28:
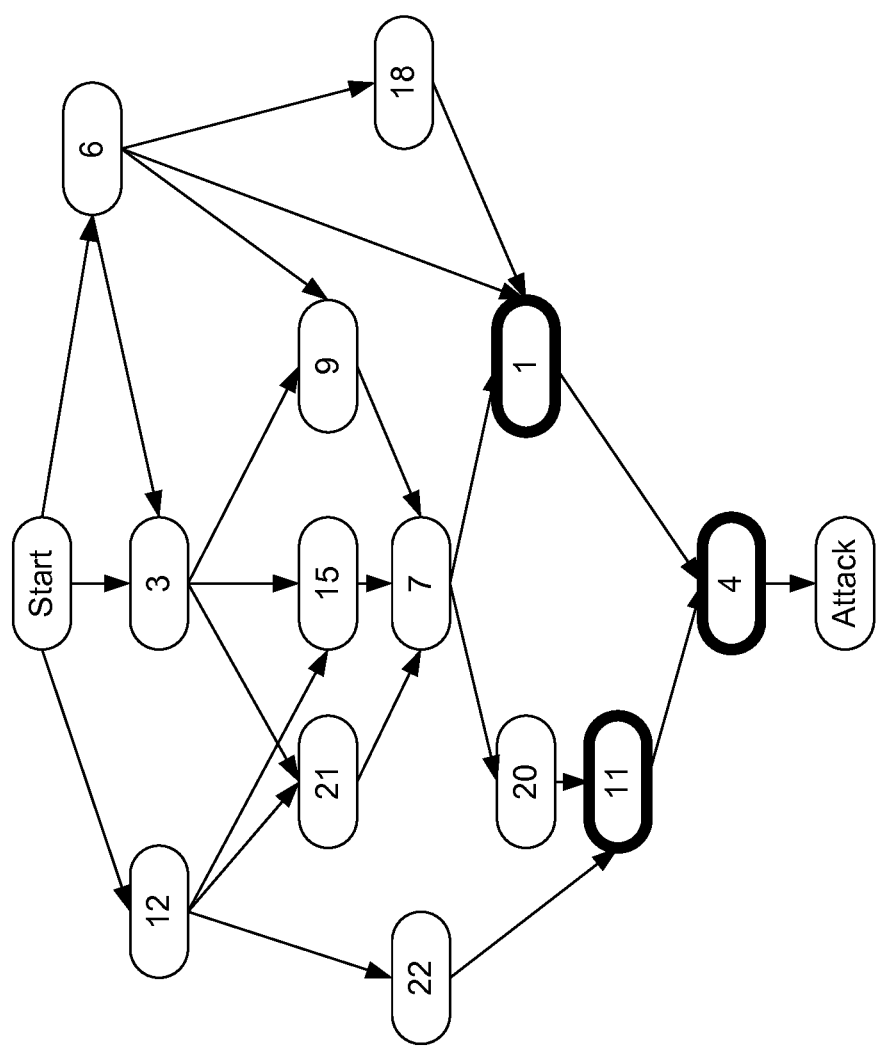
FIG. 28 illustrates a data structure storing a directed graph representation of sequences of VM configuration parameters for an attack characteristic in accordance with an exemplary embodiment of the present disclosure.

To illustrate this challenge clearly reference is made to FIG. 28. FIG. 28 illustrates a data structure storing a directed graph representation of sequences of VM configuration parameters for an attack characteristic in accordance with an exemplary embodiment of the present disclosure. The directed graph of FIG. 28 is considerably larger and more complex than that previously considered and it is to be recognized that directed graphs modeling sequences of VM parameters for real deployed VMs can be large and complex with many sequences leading from a "start" vertex to an "attack" vertex corresponding to an attack characteristic. Notably the graph of FIG. 28 shows many alternative sequences to achieve the attack characteristic, such as the initial selection between vertices 12, 3 and 6, and even then further selections such as from vertex 12 to any of vertices 22, 21 and 15. Thus it can be seen that there are many routes through the graph of FIG. 28. However, there are notably commonalities in the graph of FIG. 28 also. In particular, all sequences ultimately pass through one of vertices 11 or 1 and all sequences ultimately pass through vertex 4. Other commonalities can be found also, such as all sequences pass through one of vertex 22, 7 or 1, and others that can be identified. Thus it is possible to rationalize a particular sequence or sequences through the directed graph to common vertices and address mitigation measures to the VM parameters associated with those vertices. Such rationalization will involve the selection of a subset of vertices through which all sequences pass. This selection can be driven by an objective, such as a predetermined criteria. For example, the predetermined criteria can require that the selection of vertices for mitigation is based on a minimum number of vertices to cover all sequences through the graph. Alternatively other criteria may be used, such as a proportion coverage of sequences or a guaranteed coverage of specific sequences.

In some cases mitigation of a particular VM parameter may not be possible or may be undesirable. For example, a security facility may not be available for a particular VM parameter and/or it may not be possible to reconfigure a VM parameter due to constraints on the VM. For example, a VM operating as a web server must communicate via HTTP networking ports and it may therefore not be possible to close those ports on such a server. Accordingly, it can be desirable to select mitigation measures and vertices in the graph as a basis for mitigation based on some ranking, prioritization or preference mechanism such that more appropriate/preferred VM parameters are modified in favor of less appropriate/preferred parameters.

In one embodiment some or all vertices (and the VM parameters they represent) in the directed graph are each associated with a predetermined weight or score. In such an embodiment the predetermined criteria for selecting vertices for mitigation are defined based on such weights or scores. For example, individual vertices can be selected that meet a predetermined threshold weight or score. Alternatively, a collection of vertices can be selected that collectively meet a predetermined weight or score (i.e. a total of all weights or scores meets a predetermined condition). Such a condition can be, for example, a maximum or minimum weight or score. Such an approach is helpful where it is desirable to indicate an importance, relevance, appropriateness or preference of VM parameters such that, for example, a weight or score can indicate an importance of a VM parameter where parameters that are more important have more impact on an overall weight.

Figure 29:
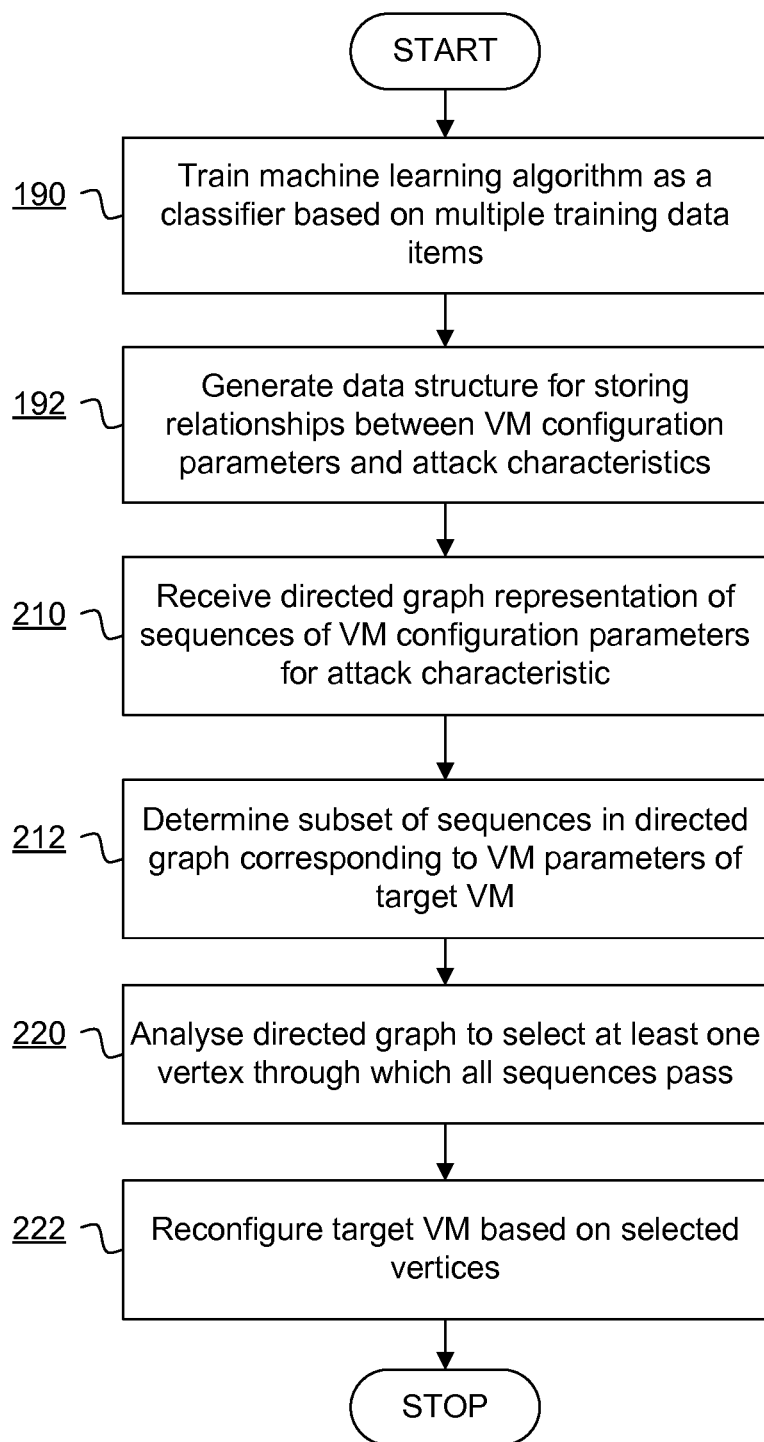
FIG. 29 is a flowchart of a method to mitigate a security attack against a target virtual machine in accordance with embodiments of the present disclosure.

Thus FIG. 29 is a flowchart of a method to mitigate a security attack against a target virtual machine in accordance with embodiments of the present disclosure. Initially the method performs 190, 192, 210 and 212 as previously described. Subsequently, at 220 the directed graph is analyzed to select at least one vertex through which all sequences for the attack characteristic pass. This analysis can be achieved by various algorithms as will be apparent to those skilled in the art for directed graph analysis such as a method in which all possible sequences through the graph are identified to determine individual vertices common to all sequences or a set of vertices whereby each sequence through the graph includes at least one element from the set. Subsequently, at 222, the method reconfigures the target VM based on the selected vertices to mitigate attacks exhibiting the attack characteristic.

All the above methods are effective for identifying and/or mitigating attacks exhibiting an attack characteristic. However, a challenge remains where an attack characteristic continues to be observed in a VM despite mitigation. For example, where all sequences through the directed graph are blocked and yet an attack persists. Such attack characteristics can arise as a result of the attack adapting to employ other services and/or facilities of a VM not currently modeled in the directed graph. Such a situation can be addressed by causing the retraining of the RBM to provide for the regeneration of the feature classification data structure. In particular, the retraining of the RBM must be undertaken with at least some training examples (data items) corresponding to the attack having the attack characteristic that exists despite the mitigation measures. Accordingly, the retraining will generate a new feature classification data structure 142 on which bases a new directed graph can be generated. Such new directed graph can then be employed to model the VM parameters employed by the attack characteristic to implement mitigation measures as hereinbefore described.

Figure 30:
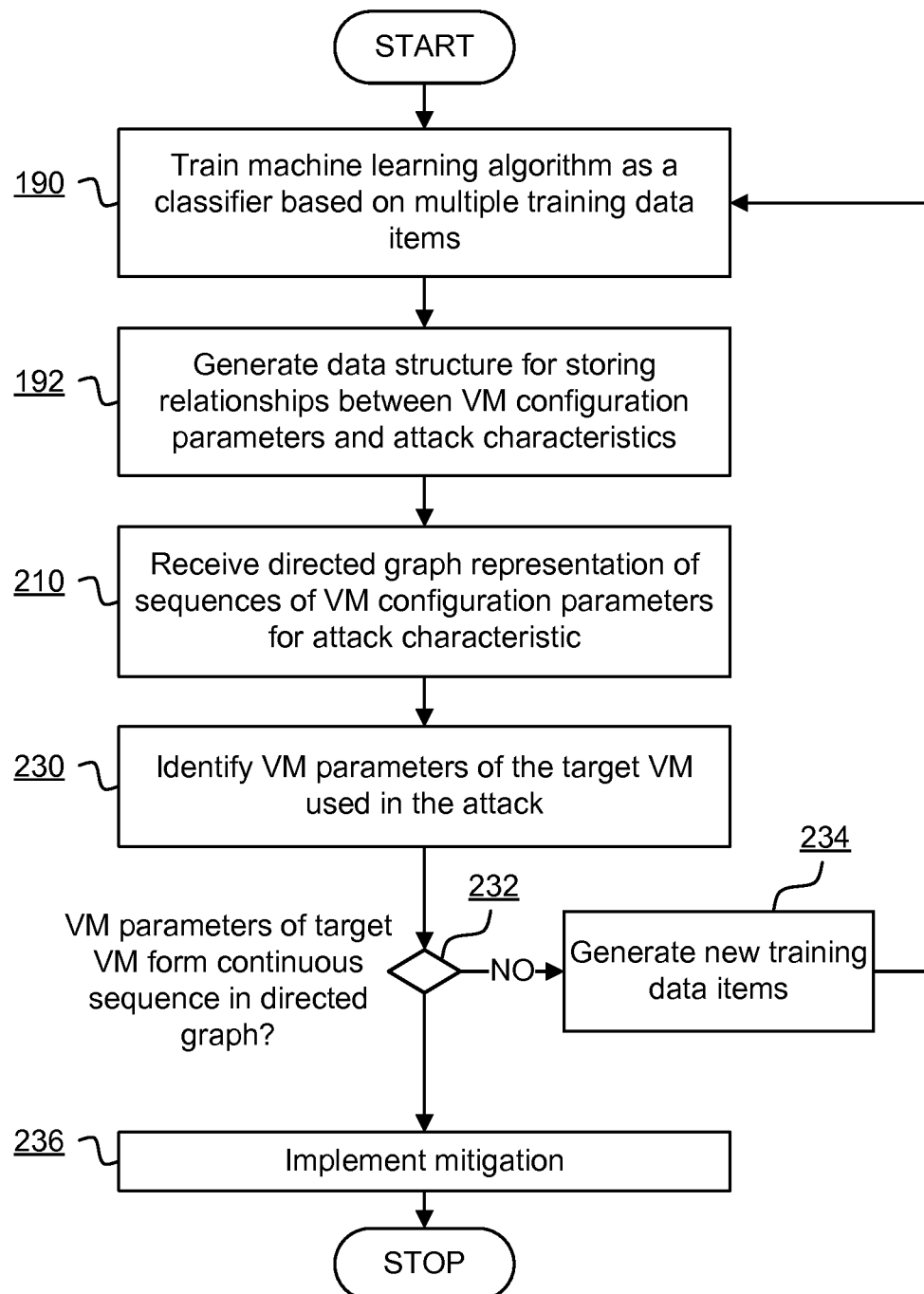
FIG. 30 is a flowchart of a method to mitigate a security attack against a target virtual machine in accordance with embodiments of the present disclosure.

Thus FIG. 30 is a flowchart of a method to mitigate a security attack against a target virtual machine in accordance with embodiments of the present disclosure. Initially the method performs 190, 192 and 210 as previously described. Subsequently, at 230, the method identifies VM parameters of a target VM used in the security attack, such as by way of the techniques described above. At 232 the method determines if the security parameters form a continuous sequence in the directed graph from a start vertex to an attack vertex. Where there is such a continuous sequence then a mitigation can be implemented at 236 in accordance with the techniques described hereinbefore. However, where there is no such sequence then the method proceeds to 234 in which new training data items are generated for one or more training VMs including VMs subject to the attack for which a sequence was not identified. Subsequently the method causes retraining of the RBM by returning to 190 and the method repeats until a sequence through a regenerated directed graph is identified on which basis mitigation can be applied.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method to mitigate a security attack against a target virtual machine (VM) in a virtualized computing environment, the target VM having a target VM configuration including configuration parameters, and the security attack exhibiting a particular attack characteristic, the method comprising:

training a machine learning algorithm as a classifier based on a plurality of training data items, each training data item corresponding to a training VM and including a representation of parameters for a configuration of the training VM and a representation of characteristics of security attacks for the training VM;

generating a first data structure for storing one or more relationships between VM configuration parameters and attack characteristics, wherein the first data structure is generated by sampling the trained machine learning algorithm to identify the one or more relationships;

receiving a second data structure storing a directed graph representation of one or more sequences of VM configuration parameters for achieving the particular attack characteristic of the security attack, the VM configuration parameters in the directed graph being determined based on the first data structure;

identifying VM parameters of the target VM used in the security attack as a subset of sequences in the directed graph representation corresponding to VM parameters of the target VM; and reconfiguring the target VM by changing at least one of the identified VM parameters so as to stop the security attack.

2. The method of claim 1, wherein each of the attack characteristics has associated a protective measure, the method further comprising, in response to identification of an attack characteristic to which the target VM is susceptible, implementing the protective measure so as to protect the target VM from security attacks having the attack characteristic.

3. The method of claim 1, wherein the machine learning algorithm is a restricted Boltzmann machine.

4. The method of claim 1, wherein the characteristics of security attacks include an indication of a consequence of a security attack executing in the training VM.

5. The method of claim 1, wherein each training data item comprises a vector of binary values indicating each indicating a presence or an absence of a configuration feature and an attack characteristic of a corresponding training VM.

6. The method of claim 1, wherein the first data structure is a matrix data structure for mapping VM configuration parameters against attack characteristics.

7. The method of claim 3, wherein the restricted Boltzmann machine includes a plurality of hidden units and a plurality of visible units, and sampling the trained machine learning algorithm includes generating sample inputs for the hidden units to determine values of the visible units.

8. The method of claim 7, wherein each generated sample input is a vector of binary values, wherein each binary value is determined using a randomization algorithm.

9. The method of claim 2, wherein each protective measure is a configuration parameter or a change to a configuration parameter for a target VM to protect against an attack characteristic.

10. A computer system comprising:

a processor and memory storing computer program code for mitigating a security attack against a target virtual machine (VM) in a virtualized computing environment, the target VM having a target VM configuration including configuration parameters, and the security attack exhibiting a particular attack characteristic, by:

training a machine learning algorithm as a classifier based on a plurality of training data items, each training data item corresponding to a training VM and including a representation of parameters for a configuration of the training VM and a representation of characteristics of security attacks for the training VM, generating a first data structure for storing one or more relationships between VM configuration parameters and attack characteristics, wherein the first data structure is generated by sampling the trained machine learning algorithm to identify the one or more relationships, receiving a second data structure storing a directed graph representation of one or more sequences of VM configuration parameters for achieving the particular attack characteristic of the security attack, the VM configuration parameters in the directed graph being determined based on the first data structure, identifying VM parameters of the target VM used in the security attack as a subset of sequences in the directed graph representation corresponding to VM parameters of the target VM, and reconfiguring the target VM by changing at least one of the identified VM parameters so as to stop the security attack.

11. A non-transitory computer-readable storage element storing a computer program element comprising computer program code to, when loaded into a computer system and executed thereon, cause the computer system to perform steps of a method as claimed in claim 1.

\* \* \* \* \*